United States Patent [19]

Ueda et al.

[11] Patent Number: 5,589,263

[45] Date of Patent: Dec. 31, 1996

[54] MAGNETIC RECORDING MEDIUM HAVING A FERROMAGNETIC METAL THIN FILM, A DRY ETCHED LAYER, A CARBONACEOUS FILM, AND A LUBRICANT FILM

[75] Inventors: Hideyuki Ueda; Hiroshi Seki, both of Osaka; Kenji Kuwahara, Ikoma; Mikio Murai; Kiyosi Takahasi, both of Osaka; Masaru Odagiri, Kawanishi; Sadayuki Okazaki, Osaka, all of Japan

[73] Assignee: Matsushita Electric Industrial Co., Ltd., Osaka, Japan

[21] Appl. No.: 365,216

[22] Filed: Dec. 28, 1994

[30] Foreign Application Priority Data

Dec. 28, 1993 [JP] Japan .................................. 5-337781

[51] Int. Cl.$^6$ ...................................................... G11B 5/72
[52] U.S. Cl. .................... 428/336; 428/408; 428/409; 428/421; 428/457; 428/694 TP; 428/694 TC; 428/694 TF; 428/900
[58] Field of Search ....................... 428/694 TP, 694 TC, 428/694 TF, 336, 900, 408, 409, 421, 457

[56] References Cited

U.S. PATENT DOCUMENTS

| 4,124,736 | 11/1978 | Patel et al. ............................. | 428/622 |
| 4,766,034 | 8/1988 | Sato et al. .............................. | 428/336 |
| 4,826,739 | 5/1989 | Isoe et al. .............................. | 428/695 |
| 5,080,971 | 1/1992 | Yokoyama et al. ..................... | 428/336 |
| 5,232,791 | 8/1993 | Kohler et al. .......................... | 428/694 |
| 5,328,737 | 7/1994 | Takahashi et al. ..................... | 427/569 |
| 5,451,427 | 9/1995 | Takahashi et al. ..................... | 427/130 |

FOREIGN PATENT DOCUMENTS

| 62-58416 | 3/1987 | Japan . |
| 63-177312 | 7/1988 | Japan . |
| 1-184772 | 7/1989 | Japan . |
| 2-126417 | 5/1990 | Japan . |
| 2-126418 | 5/1990 | Japan . |
| 6-68834 | 8/1994 | Japan . |

Primary Examiner—Stevan A. Resan
Attorney, Agent, or Firm—Wenderoth, Lind & Ponack

[57] ABSTRACT

A ferromagnetic metal thin film recording medium having a nonmagnetic substrate, a ferromagnetic metal thin film formed on the nonmagnetic substrate, a dry etched layer which is formed in a surface layer of the ferromagnetic metal thin film and contains oxygen atoms in a higher concentration than the remaining part of the ferromagnetic metal thin film, a hard carbonaceous film formed on the dry etched layer of the ferromagnetic metal thin film, a lubricant layer formed on said hard carbonaceous film, and optionally a modified layer which is formed on the hard carbonaceous film and has a thickness of less than 3 nm, and comprises carbon, nitrogen and oxygen atoms with an atomic ratio of nitrogen to carbon being at least 0.8%, which recording medium has improved running stability, durability and weatherability while maintaining electromagnetic conversion characteristics.

25 Claims, 8 Drawing Sheets

MAGNETIC RECORDING MEDIUM HAVING A FERROMAGNETIC METAL THIN FILM, A DRY ETCHED LAYER, A CARBONACEOUS FILM, AND A LUBRICANT FILM

BACKGROUND OF THE INVENTION

1. Field of the Invention

The present invention relates to a magnetic recording medium and a method for producing the same. In particular, the present invention relates to a ferromagnetic metal thin film magnetic recording medium having a protective layer and a lubricant layer successively formed on a ferromagnetic metal thin film, which medium is used audio and video equipment, a computer, and so on, and achieves both electromagnetic conversion characteristics and practical reliability at high levels.

2. Description of the Related Art

In these years, a magnetic recording equipment is required to have a large capacity, achieve high speed reading and writing, high picture and sound quality, and have a small size and a light weight. To satisfy such requirements, it is inevitable for a magnetic recording medium to achieve a high density recording. To this end, instead of a conventional powder coating type magnetic recording medium having a magnetic layer which comprises a binder and magnetic powder dispersed in said binder, a ferromagnetic metal thin film magnetic recording medium has been actively developed and practically used, since it has a larger residual magnetic flux density (Br) and coercive force (Hc) and a thinner magnetic layer, and is more suitable for ultra-smoothing of a magnetic layer surface than the powder coating type one.

However, since a magnetic layer of the ferromagnetic metal thin film magnetic recording medium has low hardness and is easily deformed plastically, when it is directly contacted to a magnetic head of a VCR (video cassette recorder) which rotates at a high speed, it is immediately worn or flawed and adhered to a surface of the head. As a result, the durability is deteriorated, for example, a writing and reading output decreases greatly after repeated running and a still-frame life is considerably shortened. Though a surface of the magnetic layer is protected by the formation of an oxide film, corrosion resistance in a high humidity circumstance is insufficient.

To increase the lubricity, wear resistance and corrosion resistance of the ferromagnetic metal thin film magnetic recording medium, it is proposed to use a base film having minute protrusions on its surface or to form a protective layer or a layer of a fluorine-containing lubricant which provides both the lubricity and water repellency. In particular, the protective film should have a small thickness to decrease a spacing loss between the magnetic layer and the magnetic head. Then, many proposals have been made on the formation of a diamond-like carbon film which is hard and hardly worn on the magnetic layer (see Japanese Patent KOKAI Publication Nos. 210518/1986 and 98824/1988).

Japanese Patent KOKAI Publication Nos. 245417/1989 and 158909/1990 disclose a magnetic recording medium having a diamond-like carbon film on a magnetic layer and a lubricant layer of a fluorine-containing aliphatic acid on the diamond-like carbon film.

However, it is very difficult to provide a magnetic recording medium which satisfies both the running stability and the durability by the above proposed methods, and many problems arise.

For example, when only the fluorine-containing lubricant layer is formed on the magnetic layer, a shear force can be decreased, but the surface hardness of the medium is low and the medium is easily abraded, so that the running stability is deteriorated and the still-frame life is shortened.

When only a hard protective layer such as the diamond-like carbon film is formed on the magnetic layer, the protective layer itself suffers from brittle failure due to the direct contact to the magnetic head of the VCR which rotates at a high speed. As the result, the still-frame life is greatly shortened and the stability of reading output cannot be maintained when the medium is repeatedly run.

When the very hard diamond-like carbon film and the lubricant layer are successively formed on the magnetic layer, since a surface state of the diamond-like carbon film is very inactive chemically, its adhesion to the lubricant layer is insufficient, so that a material containing the lubricant component is seized on the magnetic head surface during writing and reading, whereby the output is decreased or the head gap is clogged for a long time.

When the hard carbon film is formed on the magnetic layer, since the adhesion between the magnetic layer and the hard carbon film is insufficient, the hard carbon film is partly peeled off during reading in a still mode or after long time storage in a high temperature high humidity atmosphere, and then the durability and weatherability are severely deteriorated.

Recently, to improve the adhesion between the protective layer and the lubricant layer, it is proposed (1) to form, on the ferromagnetic metal thin film, a hard carbon protective film, a nitrogen-containing plasma polymerized film and a lubricant layer comprising a fluorine-containing carboxylic acid (see Japanese Patent KOKAI Publication No. 126417/1990); (2) to form, on a ferromagnetic metal thin film, a protective layer comprising an organic polymer compound which has at least carbon atoms and nitrogen atoms with a concentration of the nitrogen atoms in a surface layer being at least 40 atomic % of the carbon atom, and a lubricant layer on the protective layer (see Japanese Patent KOKAI Publication No. 58416/1987); (3) to form a hard carbon thin film containing B, Ti or Si on a ferromagnetic metal thin film, and then provide a lubricant layer having a reactive group successively by a vacuum deposition method (see Japanese Patent KOKAI Publication No. 184722/1989); or (4) to form a protective layer comprising graphite-like carbon which contains at least one element selected from the group consisting of Mn, Mo, Nb, Ta, Ti, V and W on a ferromagnetic metal thin film and successively form a lubricant layer comprising an organic compound having a mercapto group (see Japanese Patent KOKAI Publication No. 177312/1988).

Further, Japanese Patent KOKAI Publication No. 126418/1990 discloses a ferromagnetic metal thin film magnetic recording medium in which a hard carbon film is formed on the ferromagnetic metal thin film, the surface of the hard carbon film is treated with ammonia gas by glow discharge and then a lubricant layer comprising a fluorine-containing carboxylic acid is formed thereon.

Japanese Patent KOKAI Publication No. 68834/1994 discloses a ferromagnetic metal thin film magnetic recording medium having a protective layer (a plasma polymerized layer), wherein an oxygen to carbon (O/C) ratio is 0.30 or less in the surface layer of the protective layer contacting the magnetic metal film, to increase the adhesion between the magnetic layer and the protective layer.

However, by the above recently proposed techniques, it is still difficult to provide a magnetic recording medium which is excellent both in the electromagnetic conversion characteristics and the durability. Then, still many problems should be solved.

For example, when the nitrogen-containing plasma polymerized film is formed between the hard carbon protective film and the lubricant layer as proposed in Japanese Patent KOKAI Publication No. 126417/1990, the plasma polymerized film is less hard and easily worn, so that the running stability and the durability are not sufficiently satisfied. If a thickness of the plasma polymerized film is increased to improve the wear resistance, the spacing loss between the magnetic layer and the magnetic head is increased and then the electromagnetic conversion characteristics is worsened.

When the nitrogen atom concentration in the protective layer is increased as disclosed in Japanese Patent KOKAI Publication No. 58416/1988 or when the lubricant layer is formed on the protective layer containing B, Ti, Si or the metal as disclosed in Japanese Patent KOKAI Publication Nos. 184722/1989 and 17731 2/1987, while the adhesion between the protective layer and the lubricant layer is improved, the hardness of the protective layer is decreased so that the durability such as the still-frame life is deteriorated.

When the lubricant layer is formed after treating the surface of the hard carbon protective film with the ammonia gas by glow discharge as disclosed in Japanese Patent KOKAI Publication No. 126418/1990, since the surface of the hard carbon protective is severely damaged by the bombardment of charged particles generated from the non-polymerizable ammonia gas, the durability and the weatherability are heavily deteriorated.

Since none of the above proposed techniques considers the adhesion between the ferromagnetic metal thin film and the protective layer, the weatherability of the medium is unexpectedly greatly worsened.

When the ratio of oxygen atoms to carbon atoms in the interface (a layer in which the ferromagnetic metal elements exceed 5 atomic % when the atomic composition is analyzed in the depth direction of the plasma polymerized film by the X-ray photoelectron spectroscopy or the Auger electron spectroscopy) of the plasma polymerized film contacting the magnetic layer surface is simply specified as disclosed in Japanese Patent KOKAI Publication No. 68834/1994, contaminants or low molecular weight materials which adhere to the magnetic layer surface are not removed, that is, the magnetic layer surface is not cleaned, so that the adhesion between the magnetic layer and the protective layer is not sufficiently improved and then the durability and the weatherability are not improved considerably.

SUMMARY OF THE INVENTION

An object of the present invention is to provide a ferromagnetic metal thin film magnetic recording medium which can achieve both the electromagnetic conversion characteristics and the practical reliability (e.g. running stability, durability, weatherability, etc.) at high levels.

Another object of the present invention is to provide a method for producing the ferromagnetic metal thin film recording medium having the above good properties.

According to a first aspect of the present invention, there is provided a ferromagnetic metal thin film recording medium comprising a nonmagnetic substrate, a ferromagnetic metal thin film formed on said nonmagnetic substrate, a dry etched layer which is formed in a surface layer of said ferromagnetic metal thin film and contains oxygen atoms in a higher concentration than the remaining part of said ferromagnetic metal thin film, a hard carbonaceous film formed on said dry etched layer of said ferromagnetic metal thin film, and a lubricant layer formed on said hard carbonaceous film.

According to a second aspect of the present invention, there is provided a ferromagnetic metal thin film recording medium comprising a nonmagnetic substrate, a ferromagnetic metal thin film formed on said nonmagnetic substrate, a dry etched layer which is formed in a surface layer of said ferromagnetic metal thin film and contains oxygen atoms in a higher concentration than the remaining part of said ferromagnetic metal thin film, a hard carbonaceous film formed on said dry etched layer of said ferromagnetic metal thin film, a modified layer which is formed on said hard carbonaceous film and has a thickness of less than 3 nm and comprises carbon atoms, nitrogen atoms and oxygen atoms with an atomic ratio of nitrogen to carbon being at least 0.8%, and a lubricant layer formed on said modified layer.

According to a third aspect of the present invention, there is provided a ferromagnetic metal thin film recording medium comprising a nonmagnetic substrate, a ferromagnetic metal thin film formed on said nonmagnetic substrate, a dry etched layer which is formed in a surface layer of said ferromagnetic metal thin film and contains oxygen atoms in a higher concentration than the remaining part of said ferromagnetic metal thin film, a hard carbonaceous film formed on said dry etched layer of said ferromagnetic metal thin film, a modified layer which is formed on said hard carbonaceous film and has a thickness of less than 3 nm and comprises carbon atoms, nitrogen atoms and oxygen atoms with an atomic ratio of nitrogen to carbon being at least 0.8% and in which a concentration of nitrogen atoms decreases in a depth direction from its surface, and a lubricant layer formed on said modified layer.

According to a fourth aspect of the present invention, there is provided a method for producing a ferromagnetic metal thin film magnetic medium comprising the steps of forming a ferromagnetic metal thin film on a nonmagnetic substrate, irradiating said ferromagnetic metal thin film by chemical active species comprising atomic oxygen in vacuum to form a dry etched layer, forming a hard carbonaceous film without breaking vacuum, and forming a lubricant layer on said hard carbonaceous film.

According to a fifth aspect of the present invention, there is provided a method for producing a ferromagnetic metal thin film magnetic medium comprising the steps of forming a ferromagnetic metal thin film on a nonmagnetic substrate by vacuum vapor deposition method, ion plating method or sputtering method, irradiating said ferromagnetic metal thin film by chemical active species comprising atomic oxygen in vacuum to form a dry etched layer without breaking vacuum, forming a hard carbonaceous film without breaking vacuum, and forming a lubricant layer on said hard carbonaceous film.

According to a sixth aspect of the present invention, there is provided a method for producing a ferromagnetic metal thin film magnetic medium comprising the steps of forming a ferromagnetic metal thin film on a nonmagnetic substrate, irradiating said ferromagnetic metal thin film by chemical active species comprising atomic oxygen in vacuum to form a dry etched layer, forming a hard carbonaceous film without breaking vacuum, exposing said hard carbonaceous film to glow discharge plasma using a gaseous mixture of a nitrogen-containing organic compound and an inorganic compound without breaking vacuum to form a modified layer and forming a lubricant layer on said modified layer.

According to a seventh aspect of the present invention, there is provided a method for producing a ferromagnetic metal thin film magnetic medium comprising the steps of forming a ferromagnetic metal thin film on a nonmagnetic substrate, irradiating said ferromagnetic metal thin film by chemical active species comprising atomic oxygen in vacuum to form a dry etched layer, forming a hard carbonaceous film without breaking vacuum, exposing said hard carbonaceous film to glow discharge plasma using a gaseous mixture of a nitrogen-containing organic compound, a hydrocarbon and an inorganic compound without breaking vacuum to form a modified layer and forming a lubricant layer on said modified layer.

According to an eighth aspect of the present invention, there is provided a method for producing a ferromagnetic metal thin film magnetic medium comprising the steps of forming a ferromagnetic metal thin film on a nonmagnetic substrate by vacuum vapor deposition method, ion plating method or sputtering method, irradiating said ferromagnetic metal thin film by chemical active species comprising atomic oxygen without breaking vacuum to form a dry etched layer, forming a hard carbonaceous film without breaking vacuum, exposing said hard carbonaceous film to glow discharge plasma using a gaseous mixture of a nitrogen-containing organic compound and an inorganic compound without breaking vacuum to form a modified layer and forming a lubricant layer on said modified layer.

According to a ninth aspect of the present invention, there is provided a method for producing a ferromagnetic metal thin film magnetic medium comprising the steps of forming a ferromagnetic metal thin film on a nonmagnetic substrate by vacuum vapor deposition method, ion plating method or sputtering method on a non-magnetic substrate, irradiating said ferromagnetic metal thin film by chemical active species comprising atomic oxygen without breaking vacuum to form a dry etched layer, forming a hard carbonaceous film without breaking vacuum, exposing said hard carbonaceous film to glow discharge plasma using a gaseous mixture of a nitrogen-containing organic compound, a hydrocarbon and an inorganic compound without breaking vacuum to form a modified layer and forming a lubricant layer on said modified layer.

In the methods of the present invention, since the ferromagnetic metal thin film is irradiated by the chemical active species comprising atomic oxygen, the dry etched surface layer is formed, from which the contaminants and the low molecular weight compounds adhered to the ferromagnetic metal thin film are selectively removed without thermally damaging the magnetic recording medium, whereby the adhesion between the ferromagnetic metal thin film and the hard carbonaceous film is surprisingly improved.

In the inventions of the second and third aspects, since the modified layer, which has a thickness of 3 nm or less and contains an adequate concentration of the nitrogen atoms which have a large chemical affinity with the polar group introduced in the lubricant molecule is formed on the hard carbonaceous film, the lubricant molecules are strongly retained on the surface of the ferromagnetic metal thin film magnetic recording medium without decreasing the hardness of the protective layer consisting of the hard carbonaceous film and the modified layer and without increasing the spacing loss between the ferromagnetic metal thin film and the magnetic head. In particular, in the case of the invention of the third aspect, since the nitrogen concentration in the modified layer decreases in the depth direction from its surface towards the interface with the hard carbonaceous film, an internal stress can be moderately relaxed in the modified layer.

Since the chemical active species (excited species) in the plasma can be deposited while cleaning the surface of the hard carbonaceous film by exposing the hard carbonaceous film to glow discharge plasma using the gaseous mixture of a nitrogen-containing organic compound, an inorganic compound and optionally a hydrocarbon, the good adhesion between the hard carbonaceous film and the modified layer is achieved.

When the ferromagnetic metal thin film, the dry etched surface layer and the hard carbonaceous film are formed continuously in vacuum, namely without breaking the vacuum between the steps, or when the ferromagnetic metal thin film, the dry etched surface layer, the hard carbonaceous film and the modified layer are formed continuously in vacuum, adsorption of moisture and so on from an air to the ferromagnetic metal thin film or the modified layer can be considerably decreased.

Accordingly, since the effects of the hard carbonaceous film and the lubricant layer can be achieved synergistically, it is possible to provide a magnetic recording medium having greatly improved running stability, durability and weatherability without deteriorating the electromagnetic conversion characteristics.

DETAILED DESCRIPTION OF THE INVENTION

Figure 1:
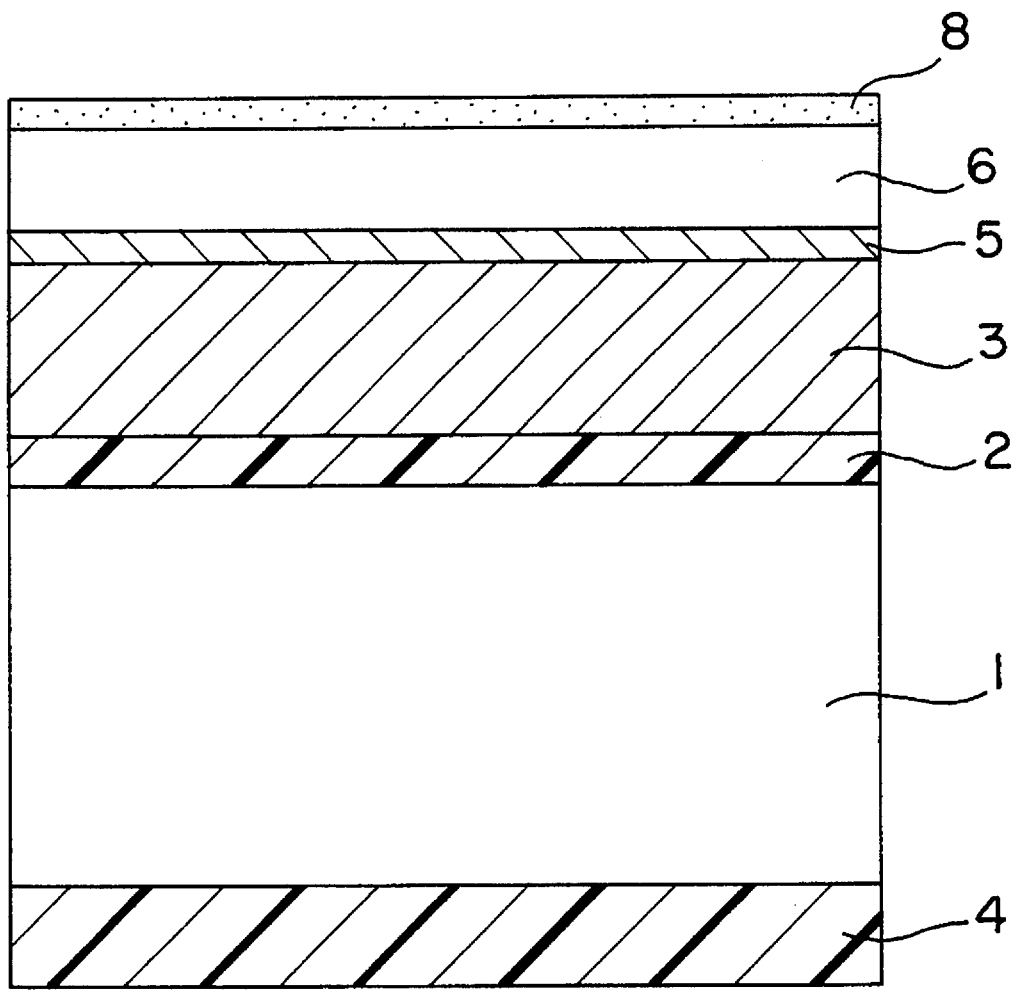
FIG. 1 is an enlarged cross sectional view of a ferromagnetic metal thin film according to the present invention.

Now, the present invention will be explained in detail.

The present invention can be applied to any of ferromagnetic metal thin film magnetic media such as an audio tape, a video tape, a magnetic disc and so on.

The non-magnetic substrate may be any one of conventionally used substrates for the magnetic recording medium. Preferred examples of the non-magnetic substrate are polymer films such as polyethylene terephthalate film, a polyethylene naphthalate film, polyamide film, polyimide film, and so on.

A surface of the substrate may be provided with minute protrusions having a maximum height ($R_{max}$) of 10 nm to 30 nm. The protrusions may be formed by the addition of minute inorganic particles such as $SiO_2$.

The ferromagnetic metal thin film can be formed by, for example, a vapor deposition method comprising heating and evaporating a metal source of a ferromagnetic metal such as Co, Co—Ni alloy by an electron beam and the like and depositing the metal on the substrate while introducing a slight amount of oxygen gas in a vacuum chamber. In addition to the vapor deposition method, the ferromagnetic metal thin film can be formed by any of known methods such as ion plating, sputtering and the like.

Preferably, the ferromagnetic metal is cobalt consisting of columnar crystal particles.

A thickness of the metal thin film is usually from 150 nm to 200 nm.

The dry etched layer on the ferromagnetic metal thin film is formed by irradiating the surface of the ferromagnetic metal thin film with the chemically active species (excited species) comprising atomic oxygen, by plasma etching, sputtering etching, ion beam etching, and so on. As the oxidizing gas, any other gas containing an oxygen atom can be used in addition to the oxygen.

In general, the dry etched layer has a thickness of 1 nm to 20 nm. In the dry etched layer, preferably, an atomic ratio of oxygen to cobalt is at least 1.5 and an atomic ratio of oxygen to carbon is at least 0.50. Further, the dry etched layer contains $Co_3O_4$ and/or $Co_2O_3$.

Preferably, the dry etched layer has a critical surface tension of at least $40 \times 10^{-5}$ N/cm.

The hard carbonaceous film can be formed by any of conventional method such as the plasma CVD method, the ion beam sputtering method, the laser beam evaporation method and so on, and generally has a thickness of 8 to 15 nm. Preferably, the hard carbonaceous film has a Vickers hardness of at least 2000 kg/mm².

As the nitrogen-containing compound to be used in the modification of the carbonaceous film surface, any organic compound which is in the gas state or can be vaporized may be used. Example of the nitrogen-containing compound as pyridine, allylamine and n-propylamine and so on. As the inorganic gas, any inorganic gas such as argon, helium, hydrogen, nitrogen, oxygen, ammonia and so on may be used.

As the hydrocarbon, any hydrocarbon such as aliphatic hydrocarbons and aromatic hydrocarbons may be used.

In the modified layer, an atomic ratio of nitrogen to oxygen is at least 10 atomic %. Further, a total amount of nitrogen, oxygen and carbon atoms which contribute to the C—N and C—O bonds is at least 3.0 atomic %, and a total amount of the nitrogen and oxygen atoms which contribute to the N—O bonds is more than zero and not more than 1.0%.

The lubricant layer 8 may comprise a fluorine-containing lubricant having a polar group. The lubricant may be coated by a wet coating method and usually has a thickness of about 3 nm.

The fluorine-containing lubricant may be any one of conventionally used fluorine-containing lubricants having a polar group. Specific examples of the polar group are —COOH, —OH, —SH, —NH$_2$, =NH, —NCO, —CONH$_2$, —CONHR, —CONR$_2$, —COOR, =PR, =PRO, =PRS, —OPO(OH)$_2$, —OPO(OR)$_2$, —SO$_3$M wherein R is a hydrocarbon group having 1 to 22 carbon atoms, and M is a hydrogen atom, an alkali metal atom or an alkaline earth metal atom.

The back coat layer may be a conventional one. For example, it is formed by coating a paint comprising an inorganic filler such as carbon black and calcium carbonate and a binder resin such as a polyester resin and nitrocellulose and drying it. A thickness of the back coating layer can be about 500 nm, though it may be increased or decreased.

The present invention will be illustrated by making reference to the accompanying drawings.

First Embodiment

The first and fourth aspects of the present invention will be explained.

FIG. 1 shows an enlarged cross section of a ferromagnetic metal thin film magnetic tape according to the first aspect of the present invention, which comprises a non-magnetic substrate 1 having a minute protrusion layer 2, a ferromagnetic metal thin film 3, a dry etched layer 5, a hard carbonaceous film 6, a lubricant layer 8 and a back coat layer 4.

The non-magnetic substrate may be any one of conventionally used substrates for the magnetic recording medium. Preferred examples of the non-magnetic substrate are polymer films such as polyethylene terephthalate film, a polyethylene naphthalate film, polyamide film, polyimide film, and so on.

The surface having the minute protrusions 2 has a maximum height ($R_{max}$) of 10 nm to 30 nm.

The ferromagnetic metal thin film 3 can be formed by an oblique vapor deposition method comprising heating and evaporating a metal source of a ferromagnetic metal such as Co, Co—Ni alloy by an electron beam and the like and depositing the metal on the substrate by continuously changing a deposition angle while introducing a slight amount of oxygen gas in a vacuum chamber.

A thickness of the metal thin film is usually from 150 nm to 200 nm.

The back coat layer 4 may be a conventional one. For example, it is formed by coating a paint comprising an inorganic filler such as carbon black and calcium carbonate and a binder resin such as a polyester resin and nitrocellulose and drying it. A thickness of the back coating layer can be about 500 nm, though it may be increased or decreased.

The dry etched layer 5 is formed by irradiating the surface of the ferromagnetic metal thin film 3 with the chemical active species (excited species) comprising atomic oxygen. In general, the dry etched layer 5 has a thickness of 1 nm to 20 nm.

The hard carbonaceous layer 6 can be formed by any of conventional method such as the plasma CVD method and generally has a thickness of 8 to 15 nm.

The lubricant layer 8 may comprise a fluorine-containing lubricant having a polar group such as a carboxyl group in a molecule. The lubricant may be coated by a wet coating method and usually has a thickness of about 3 nm.

Figure 3:
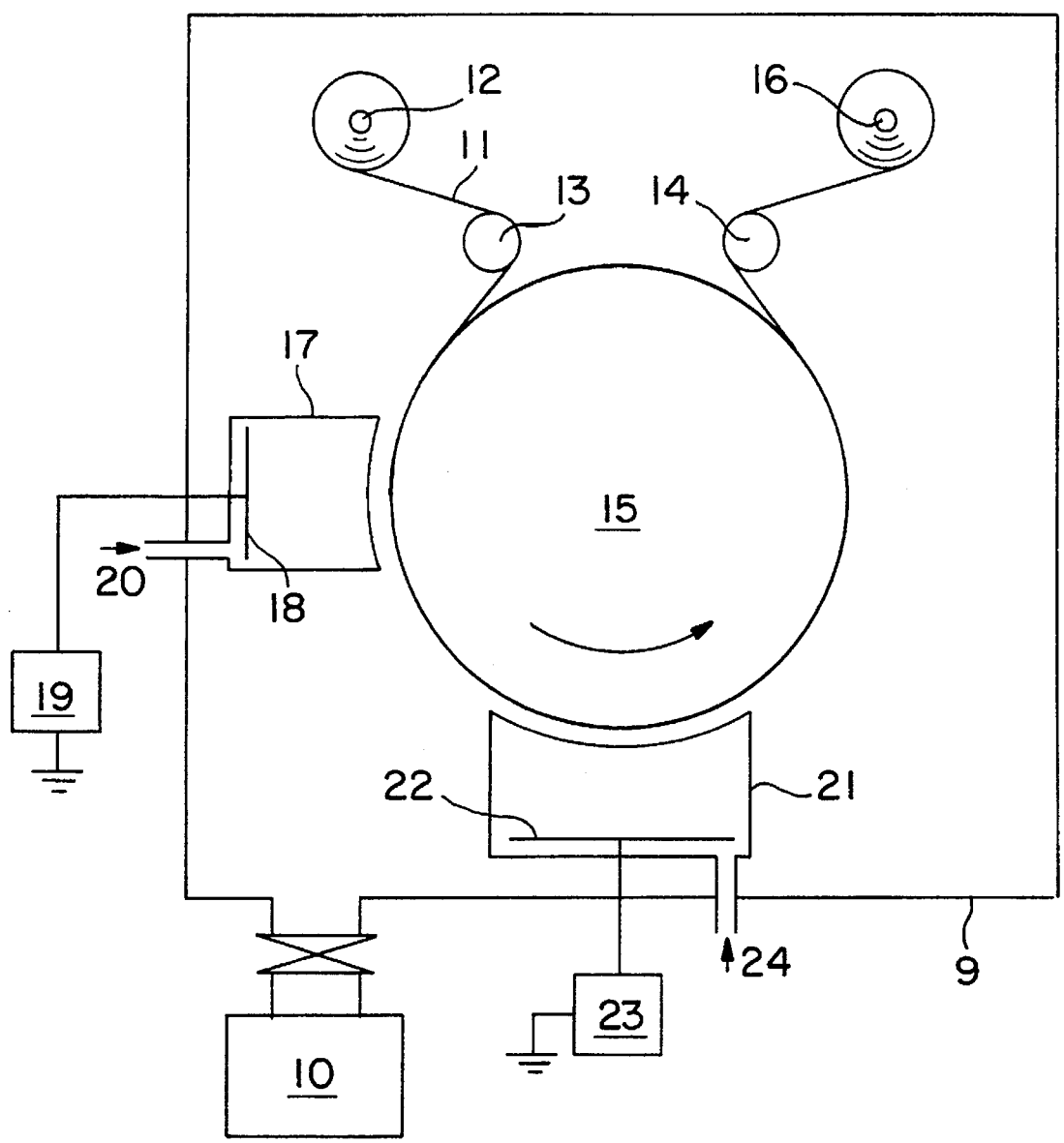
FIGS. 3 to 8 schematically show various types of apparatuses which are used in the production methods of the ferromagnetic metal thin film according to the present invention.

FIG. 3 schematically shows an apparatus used for the production of the magnetic recording medium of the above first embodiment. By this apparatus, the dry etched layer 5 and the hard carbonaceous film 6 can be formed in vacuum continuously. That is, the production of the ferromagnetic metal thin film magnetic recording medium corresponds to the production method of the third aspect of the present invention.

This apparatus comprises a vacuum chamber 9, a vacuum pump 10 to evacuate the vacuum camber 9, an unwinder roll 12, pass rolls 13, 14, a cooling drum 15, a winder roll 16, a discharge tube 17 for forming the dry etched layer 5, namely a space for generating nonequilibrium plasma, and a discharge tube 21 for forming the hard carbonaceous film 6.

The vacuum chamber 9 is evacuated by the vacuum pump 10 to a pressure of $10^{-4}$ torr to $10^{-5}$ torr.

A sheet 11 of the non-magnetic substrate on which the ferromagnetic metal thin film 3 and the back coat layer 4 have been formed is supplied from the unwinder roll 12, passed over the pass roll 13, the cooling drum 14 and the pass roll 14 and then taken up on the winder roll 16. The cooling drum 15 functions to control a conveying rate of the sheet 11 at a constant rate.

The discharge tube 17 comprises a punching metal discharge electrode 18 which is connected to a plasma-generating power source 19. As the power source 19, any of a system for applying a direct current or an alternating current and a system for superposing the direct current and the alternating current can be used. The oxidizing gas is supplied in the discharge tube 17 from a gas inlet 20.

The discharge tube 21 has a pipe-form electrode 22 which is connected to a plasma-generating power source 23. As the power source 23, any of a system for applying a direct current or an alternating current and a system for superposing the direct current and the alternating current can be used. A raw material gas for the plasma which comprises a hydrocarbon gas and an inorganic gas such as argon is supplied from a gas inlet 24 in the discharge tube 21.

Examples of the first embodiment will be described.

EXAMPLE 1-1

On one surface of a polyethylene terephthalate film 1 having a thickness of 10 μm which surface had a minute protrusion layer 2 having $10^5$ to $10^9$ minute protrusion per one $mm^2$ with the maximum height roughness $R_{max}$ of 15 nm and a diameter of about 200 nm measured by the surface structure analysis with a scanning tunneling microscope (STM), a ferromagnetic metal thin film 3 of Co—O having a thickness of 180 nm was formed by the continuously incident angle changing vapor deposition method. Further, on the other surface of the polyethylene terephthalate film 1, a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method.

Then, the formed sheet 11 was set on the unwinder roll 12 in the vacuum chamber 9 of the apparatus of FIG. 3.

After evacuating the interior of the vacuum chamber 9, an oxygen gas as an oxidizing gas was introduced in the discharge tube 17 with adjusting the gas flow rate to keep the pressure at 0.05 torr.

In the discharge tube 21, a hexane gas as a hydrocarbon gas and an argon gas as an inorganic gas were introduced at a molar ratio of 4:1 (hexane to argon) with adjusting the flow rates to keep the pressure at 0.3 torr.

Thereafter, the sheet 11 was conveyed at a rate of 5 m/min. around the drum 15 while a direct current of 800 V was applied to the punching metal discharge electrode 18 to generate nonequilibrium plasma by which the surface of the ferromagnetic metal thin film 3 was dry etched to form the dry etched layer 5 having a thickness of 5 nm.

Further, the direct current of 1300 V was applied to the pipe-form discharge electrode 22 to generate the nonequilibrium plasma to form a hard carbonaceous film 6 having a thickness of 12 nm on the dry etched layer 5.

Then, on the surface of the hard carbonaceous film 6, a solution of $C_5F_{11}(CH_2)_{10}COOH$ in isopropanol at a concentration of 2000 ppm was wet coated and dried to form a lubricant layer 8 having a thickness of 3 nm. Then, the sheet was slit to a width of 8 mm to obtain a 8 mm VCR tape.

The hard carbonaceous film 5 formed in this Example had the Vickers hardness of 2600 $kg/mm^2$.

EXAMPLE 1-2

In the same manner as in Example 1—1 except that the pressure of the oxygen gas for dry etching the ferromagnetic metal thin film 3 was changed to 0.1 torr to form a dry etched layer having a thickness of 8 nm, a 8 mm VCR tape was produced.

EXAMPLE 1-3

In the same manner as in Example 1—1 except that the pressure of the oxygen gas for dry etching the ferromagnetic metal thin film 3 was changed to 0.15 torr and a direct current of 1500 V was applied to the discharge electrode 18 to form a dry etched layer having a thickness of 18 nm, a 8 mm VCR tape was produced.

EXAMPLE 1-4

In the same manner as in Example 1-1 except that a direct current of 500 V was applied to the discharge electrode 18 to form a dry etched layer having a thickness of 2 nm, a 8 mm VCR tape was produced.

COMPARATIVE EXAMPLE 1-1

In the same manner as in Example 1 except that no dry etched layer was formed and the hard carbonaceous film 6 was formed directly on the ferromagnetic metal thin film 3, a 8 mm VCR tape was produced.

COMPARATIVE EXAMPLE 1-2

In the same manner as in Example 1-1 except that the thickness of the dry etched layer 5 was changed to 22 nm, a 8 mm VCR tape was produced.

COMPARATIVE EXAMPLE 1-3

In the same manner as in Example 1-1 except that the pressure of the oxygen gas for dry etching the ferromagnetic metal thin film 3 was changed to 0.03 torr and a direct current of 300 V was applied to the discharge electrode 18 to form a dry etched layer having a thickness of 1 nm, a 8 mm VCR tape was produced.

COMPARATIVE EXAMPLE 1-4

In the same manner as in Example 1-1 except that the Vickers hardness of the hard carbonaceous film was changed to 1300 $kg/mm^2$ a 8 mm VCR tape was produced.

Atomic ratios of oxygen to cobalt (O/Co) and oxygen to carbon (O/C) and the chemical bonding state of cobalt atoms in the dry etched layer 5 in Examples 1-1 to 1-4 and Comparative Examples 1-1 to 1-4 were measured at a depth where an atomic ratio of the cobalt atom to the whole atoms exceeded 15%, when the atomic composition of the sheet 11 on which the fluorine-containing lubricant layer 8 was not formed was analyzed by the X-ray photoelectron spectroscopy (XPS) using the $Ar^+$ ion sputtering in the depth direction.

An atomic ratio of oxygen to carbon (O/C) was measured at an interface between the hard carbonaceous film 6 and the dry etched layer 5, that is, a part of the carbonaceous film where an the atomic ratio of the cobalt atom to the whole atoms exceeded 5%.

A critical surface tension ($\gamma_c$) on the surface of the dry etched layer 5 was calculated as follows:

On the surface of the dry etched layer 5 of the sheet 11 on which hard carbonaceous film 6 was not formed, each of four wettability standard solutions having surface tensions of $38 \times 10^{-5}$, $45 \times 10^{-5}$, $54 \times 10^{-5}$ and $72 \times 10^{-5}$ N/cm, respectively, was dropped and a contact angle θ of each of the solutions was measured. Then, cosines of angles θ (cosθ) were plotted against surface tensions of the wettability standard solutions (Zismann plot). A surface tension corresponding to an intersection between a line obtained by the least square method from the plot and the line at cosθ =1.0 was read and this value was defined as the critical surface tension $\gamma_c$.

The Vickers hardness was measured as follows:

On a silicon wafer instead of the sheet 11, several hard carbonaceous films having different thicknesses of 1 to 3 μm were formed, and their Vickers hardness was measured using a micro hardness meter. A thickness of the carbonaceous film was measured by an ellipsometer. Then, from the dependency line of the hardness on the thickness, a Vickers hardness at the carbonaceous film thickness of 12 nm was calculated and used as the Vickers hardness in Examples and Comparative Examples.

The above results are shown in Table 1.

TABLE 1

| Example No. | Properties of dry etched layer | | | | | Poperties of hard carbonaceous layer | |
|---|---|---|---|---|---|---|---|
| | O/Co ratio | O/C ratio | Presence of $Co_3O_4$ or $Co_2O_3$ | $\gamma_c$ [N/cm] | Thickness (nm) | O/C ratio | Vickers hardness (kg/mm$^2$) |
| 1-1 | 2.0 | 0.62 | Yes | $46 \times 10^{-5}$ | 5 | 0.18 | 2600 |
| 1-2 | 2.3 | 0.69 | Yes | $48 \times 10^{-5}$ | 8 | 0.20 | 2600 |
| 1-3 | 2.6 | 0.78 | Yes | $51 \times 10^{-5}$ | 18 | 0.31 | 2600 |
| 1-4 | 1.6 | 0.51 | Yes | $41 \times 10^{-5}$ | 2 | 0.14 | 2600 |
| C. 1-1 | — | — | — | — | — | 0.09 | 2600 |
| C. 1-2 | 2.8 | 0.83 | Yes | $54 \times 10^{-5}$ | 22 | 0.34 | 2600 |
| C. 1-3 | 1.3 | 0.32 | No | $37 \times 10^{-5}$ | 1 | 0.12 | 2600 |
| C. 1-4 | 1.9 | 0.63 | Yes | $44 \times 10^{-5}$ | 5 | 0.19 | 1300 |

With each of the VCR tapes produced in Examples and Comparative Examples, the following properties were measured:

(1) C/N ratio

Using EVS-900 (manufactured by Sony Corp.) as a 8 mm VCR for measuring a C/N ratio, a ratio of a signal (C) at 7 MHz to a noise (N) at 6.5 MHz was measured. The results are shown in Table 2 as the relative values to that of Example 1-3 as the standard (0 dB).

(2) Still-frame life

Using a 8 mm VCR which was modified to measure the still-frame life, video signal was recorded on each of the 8 mm VCR tapes produced in Examples and Comparative Examples in an atmosphere of 23° C. and 10%RH, and reproduced in a still-frame mode under a load of 30 g, and a time at which the RF output decreases by 6 dB from the original RF output was measured. The measurement was terminated after 60 minutes.

(3) Weatherability

To evaluate the weatherability of the VCR tapes, each tape was kept standing in an atmosphere of 40° C. and 90% RH for 30 days, and the surface condition of the tape such as generation of rusts and peeling off were observed and evaluated by five ranks. Rank 5 was assigned to the tape having no problem in the practical use, while Rank 1 was assigned to the tape having problems in the practical use.

The results of the above property measurements are shown in Table 2.

TABLE 2

| Example No. | Properties of VCR tape | | |
|---|---|---|---|
| | C/N (dB) | Still-frame life (min.) | Weatherability |
| 1-1 | +0.7 | >60 | 5 |
| 1-2 | +0.5 | >60 | 5 |
| 1-3 | 0 | >60 | 5 |
| 1-4 | +0.8 | >60 | 4 |
| C. 1-1 | +0.8 | 30 | 2 |
| C. 1-2 | −0.5 | >60 | 5 |
| C. 1-3 | +0.8 | 40 | 3 |
| C. 1-4 | +0.7 | 45 | 5 |

As seen from the results in Tables 1 and 2, the ferromagnetic metal thin film magnetic recording media produced in Examples according to the present invention had the greatly improved adhesion between the ferromagnetic metal thin film and the hard carbonaceous film, since the dry etched layer, from which the contaminants and the low molecular weight compounds were selectively removed, was formed by irradiating the surface of the ferromagnetic metal thin film with the chemically active species containing the atomic oxygen without thermally damaging the metal thin film magnetic media.

In Comparative Examples 1-1 and 1-3, the adhesion between the ferromagnetic metal thin film and the hard carbonaceous film was not improved and then the still-frame life and weatherability were deteriorated, since no dry etched layer was formed on the surface of the ferromagnetic metal thin film in Comparative Example 1-1, or since the atomic ratio of oxygen to cobalt and that of oxygen to carbon in the dry etched layer were outside the suitable ranges of the present invention in Comparative Example 1-3.

In Comparative Example 1-2, since the thickness of the dry etched layer was too large, the magnetic properties of the ferromagnetic metal thin film were deteriorated and then the C/N ratio was decreased.

In Comparative Example 1-4, since the Vickers hardness of the carbonaceous film was small, the still-frame life was shortened.

From the above results in Examples 1-1 to 1-4 and Comparative Examples 1-1 to 1-4, it is apparent that the atomic ratio of oxygen to carbon on the interface of the carbonaceous film contacting to the magnetic layer had no significant influence on the properties of the magnetic tape such as the still-frame life and the weatherability.

Second Embodiment

The first and fifth aspects of the present invention will be explained. The difference between the first embodiment and the second embodiment is that the ferromagnetic metal thin film 3, the dry etched layer 5 and the hard carbonaceous film 6 are continuously formed in vacuum, that is, without breaking the vacuum.

The cross section of a ferromagnetic metal thin film magnetic tape produced in the second embodiment is the same as that of the magnetic tape of the first embodiment.

Figure 4:
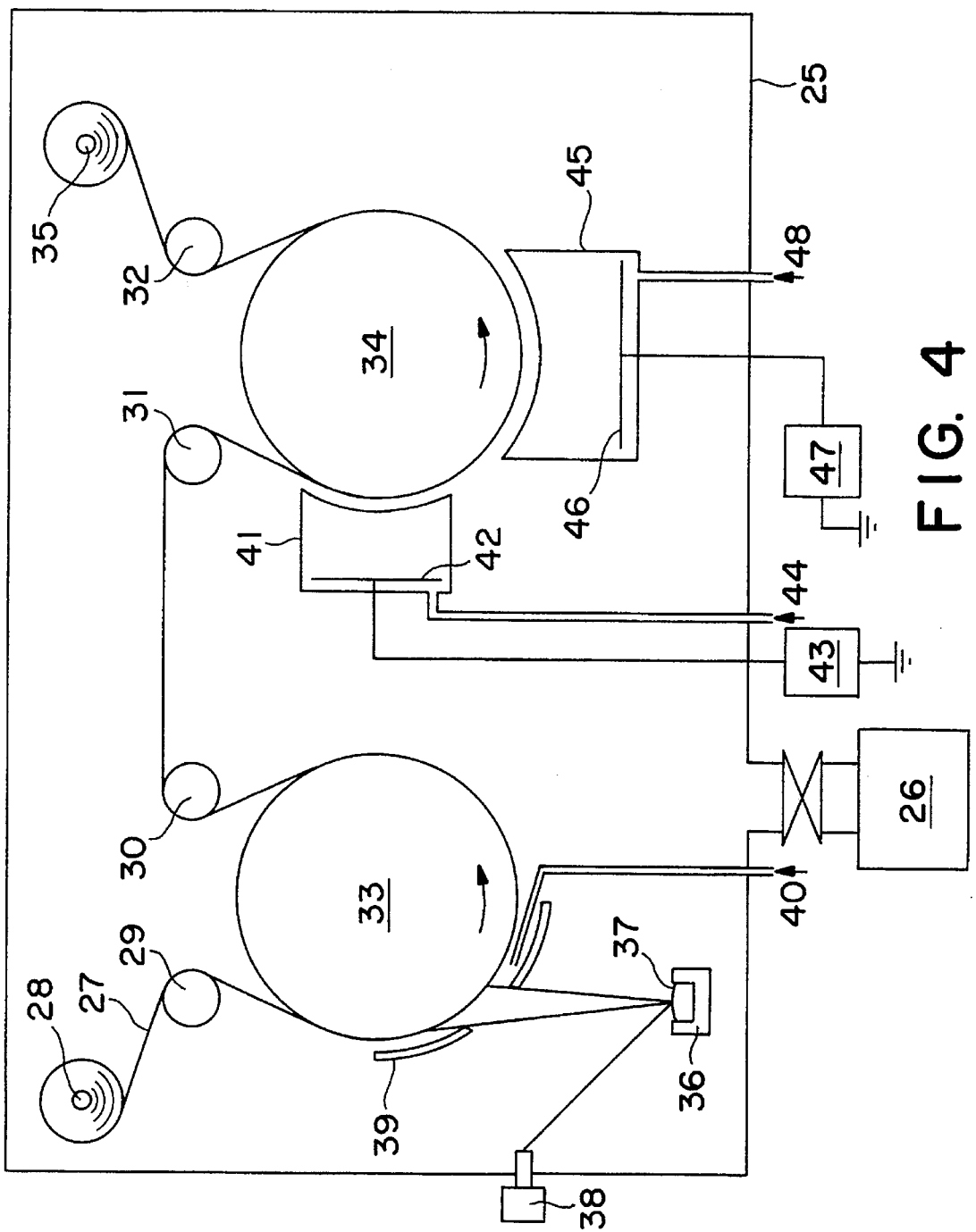

FIG. 4 schematically shows an apparatus used for the production of the magnetic recording medium of the above second embodiment. By this apparatus, the ferromagnetic metal thin film 3, the dry etched layer 5 and the hard carbonaceous film 6 can be formed in vacuum continuously. That is, the production of the ferromagnetic metal thin film magnetic recording medium corresponds to the production method of the fifth aspect of the present invention.

This apparatus comprises a vacuum chamber 25, a vacuum pump 26 to evacuate the vacuum camber 25, an unwinder roll 28, pass rolls 29, 30, 31 and 32, cooling drums 33 and 34, a winder roll 35, a crucible 36 containing an evaporation source of a ferromagnetic metal 37, an electron beam gun 38, a shielding mask 39, a discharge tube 41 for forming the dry etched layer 5, and a discharge tube 45 for forming the hard carbonaceous film 6.

The vacuum chamber 25 is evacuated by the vacuum pump 26 to a pressure of $1\times10^{-5}$ torr or lower.

A sheet 27 of the non-magnetic substrate on which the back coat layer 4 has been formed is supplied from the unwinder roll 28, passed over the pass roll 29, the cooling drum 33, the pass rolls 30 and 31, the cooling drum 34, the pass roll 32 and then taken up on the winder roll 35. The cooling drums 33 and 34 function to control a conveying rate of the sheet 27 at a constant rate.

The source of the ferromagnetic metal 37 such as cobalt contained in the crucible 36 is heated by the irradiation of electron beam from the gun 38 to generate a stream of vaporized metal. An incident angle of the ferromagnetic metal vapor onto the sheet 27 is adjusted to an angle from 70° to 40° by the shielding mask 39. From a nozzle 40, an oxygen gas is supplied to a portion near the ferromagnetic metal deposition area.

The discharge tube 41 has the same structure as the discharge tube 17 of FIG. 3 and comprises a punching metal discharge electrode 42 which is connected to a plasma-generating power source 43. As the power source 43, any of a system for applying a direct current or an alternating current and a system for superposing the direct current and the alternating current can be used. The oxidizing gas is supplied in the discharge tube 41 from a gas inlet 44.

The discharge tube 45 has the same structure as the discharge tube 21 of FIG. 3 and comprises a pipe-form electrode which is connected to a plasma-generating power source 47. As the power source 47, any of a system for applying a direct current or an alternating current and a system for superposing the direct current and the alternating current can be used. A raw material gas for the plasma which comprises a hydrocarbon gas and an inorganic gas such as argon is supplied from a gas inlet 48 in the discharge tube 45.

Examples of the second embodiment will be described.

EXAMPLE 2-1

On one surface of a polyethylene terephthalate film 1 having a thickness of 10 μm which surface had a minute protrusion layer 2 having $10^5$ to $10^9$ minute protrusion per one mm$^2$ with the maximum height roughness $R_{max}$ of 15 nm and a diameter of about 200 nm measured by the surface structure analysis with a scanning tunneling microscope (STM), a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method. The back coat layer was formed on the surface having no minute protrusion.

Then, the formed sheet 27 was set on the unwinder roll 28 in the vacuum chamber 25 of the apparatus of FIG. 4.

After evacuating the interior of the vacuum chamber 25, while the sheet was conveyed at a rate of 20 m/min. and a slight amount of oxygen gas was supplied from the nozzle 40, the cobalt metal source 37 in the crucible 36 was irradiated and heated by the electron beam gun 38 to evaporate the cobalt metal. The cobalt metal was then deposited on the other surface of the polyethylene terephthalate film 1 opposite to the back coat layer 4 at an incident angle from 70° to 40° to form a ferromagnetic metal (Co—O) film 3 having a thickness of 180 nm.

Further, an oxygen gas as an oxidizing gas was introduced in the discharge tube 41 with adjusting the gas flow rate to keep the pressure at 0.2 torr and a direct current of 1200 V was applied to the punching metal discharge electrode 42 to generate nonequilibrium plasma by which the surface of the ferromagnetic metal thin film 3 was dry etched to form the dry etched layer 5 having a thickness of 5 nm.

In the discharge tube 45, a toluene gas as a hydrocarbon gas and an argon gas as an inorganic gas were introduced at a molar ratio of 4:1 (toluene to argon) with adjusting the flow rates to keep the pressure at 0.3 torr and the direct current of 1500 V was applied to the pipe-form discharge electrode 46 to generate the nonequilibrium plasma to form a hard carbonaceous film 6 having a thickness of 10 nm on the dry etched layer 5.

Then, on the surface of the hard carbonaceous film 6, a solution of $C5F_{11}(CH_2)_{10}COOH$ in isopropanol at a concentration of 2000 ppm was wet coated and dried to form a lubricant layer 8 having a thickness of 3 nm. Then, the sheet was slit to a width of 8 mm to obtain a 8 mm VCR tape.

The hard carbonaceous film 5 formed in this Example had the Vickers hardness of 2700 kg/mm$^2$.

EXAMPLE 2-2

In the same manner as in Example 2-1 except that the pressure of the oxygen gas for dry etching the ferromagnetic metal thin film 3 was changed to 0.15 torr and a direct current of 900 V was applied to the discharge electrode 42 to form a dry etched layer having a thickness of 3 nm, a 8 mm VCR tape was produced.

COMPARATIVE EXAMPLE 2-1

In the same manner as in Example 2-1 except that, after the formation of the ferromagnetic metal thin film, the vacuum was once broken, the sheet having the ferromagnetic metal thin film was kept standing in an atmosphere of 23° C. and 60% RH for 3 days and thereafter the dry etched layer 5 and the hard carbonaceous film 6 were formed in vacuum continuously, a 8 mm VCR tape was produced.

COMPARATIVE EXAMPLE 2-2

In the same manner as in Example 2-1 except that no dry etched layer was formed, a 8 mm VCR was produced.

Atomic ratios of oxygen to cobalt (O/Co) and oxygen to carbon (O/C) and the chemical bonding state of cobalt atoms in the dry etched layer 5 in Examples 2-1 and 2-2 and Comparative Examples 2-1 and 2-2 and the Vickers hardness of the carbonaceous film were measured in the same manners as in Example 1-1.

The results are shown in Table 3.

TABLE 3

| Example No. | Properties of dry etched layer | | | | | Property of hard carbonaceous layer |
|---|---|---|---|---|---|---|
| | O/Co ratio | O/C ratio | Presence of $Co_3O_4$ or $Co_2O_3$ | $\gamma_c$ [N/cm] | Thickness (nm) | Vickers hardness (kg/mm$^2$) |
| 2-1 | 2.2 | 0.64 | Yes | $47 \times 10^{-5}$ | 5 | 2700 |
| 2-2 | 1.8 | 0.61 | Yes | $42 \times 10^{-5}$ | 3 | 2700 |
| C. 2-1 | 1.9 | 0.56 | Yes | $44 \times 10^{-5}$ | 5 | 2700 |
| C. 2-2 | — | — | — | — | — | 2700 |

With each of the VCR tapes produced in Examples 2-1 and 2-2 and Comparative Examples 2-1 and 2-2, the C/N ratio, the still-frame life and the weatherability were measured by the same methods as in Example 1-1. The C/N ratios were expressed as the relative values to that of Example 2-1 as the standard (0 dB).

Further, in these Examples and Comparative Examples, a decreasing rate or Bsδ was measured as follows:

Before and after the evaluation of weatherability of the VCR tape, Bsδ was measured and the decreasing rate was calculated.

The results are shown in Table 4.

TABLE 4

| Example No. | Properties of VCR tape | | | |
|---|---|---|---|---|
| | C/N (dB) | Still-frame life (min.) | Weatherability | Decreasing rate of Bsδ (%) |
| 2-1 | 0 | >60 | 5 | 1.8 |
| 2-2 | +0.1 | >60 | 5 | 2.2 |
| C. 2-1 | 0 | >60 | 5 | 3.5 |
| C. 2-2 | +0.1 | 50 | 3 | 6.2 |

As seen from the results in Tables 3 and 4, the ferromagnetic metal thin film magnetic recording media produced in Examples according to the present invention had the greatly improved adhesion between the ferromagnetic metal thin film and the hard carbonaceous film, since the dry etched layer from which the contaminants and the low molecular weight compounds were selectively removed was formed by irradiating the surface of the ferromagnetic metal thin film with the chemically active species containing the atomic oxygen without thermally damaging the metal thin film magnetic media. The still-frame life and the weatherability were also improved. In addition, since the ferromagnetic metal thin film, the dry etched layer and the hard carbonaceous film were continuously formed in vacuum, the adsorption of moisture and so on in the air onto the surface of the ferromagnetic metal thin film was considerably reduced so that the decreasing rate of Bsδ was made small.

In Comparative Example 2-1, the decreasing rate of Bsδ was large due the adsorption of the moisture and so on in the air onto the surface of the ferromagnetic metal thin film.

In Comparative Example 2-2, the adhesion between the ferromagnetic metal thin film and the hard carbonaceous film was not improved and then the still-frame life, weatherability and the decreasing rate of Bsδ were deteriorated, since no dry etched layer was formed on the surface of the ferromagnetic metal thin film.

Third Embodiment

The second and sixth aspects of the present invention will be explained.

Figure 2:
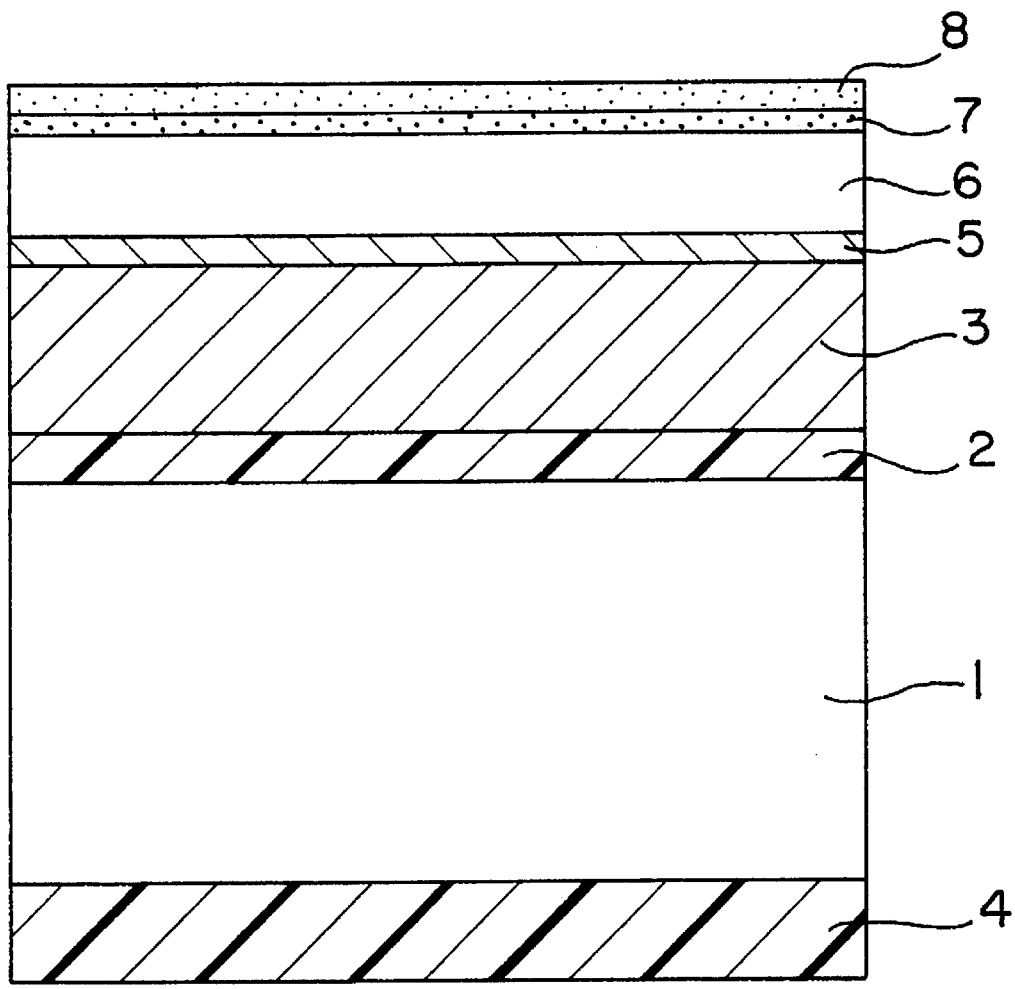
FIG. 2 is an enlarged cross sectional view of another ferromagnetic metal thin film according to the present invention.

FIG. 2 shows an enlarged cross section of a ferromagnetic metal thin film magnetic tape according to the second aspect of the present invention, which comprises a non-magnetic substrate 1 having a minute protrusion layer 2, a ferromagnetic metal thin film 3, a dry etched layer 5, a hard carbonaceous film 6, a modified layer 7, a lubricant layer 8 and a back coat layer 4.

Except the modified layer 7, the structure of the magnetic tape of the third embodiment is the same as that of the magnetic tape of the first embodiment shown in FIG. 1.

The modified layer 7 is formed by exposing the hard carbonaceous film 8 to glow discharge plasma of a gaseous mixture of a nitrogen-containing organic compound and an inorganic compound. In general, the modified layer 7 has a thickness of 3 nm or less.

Figure 5:
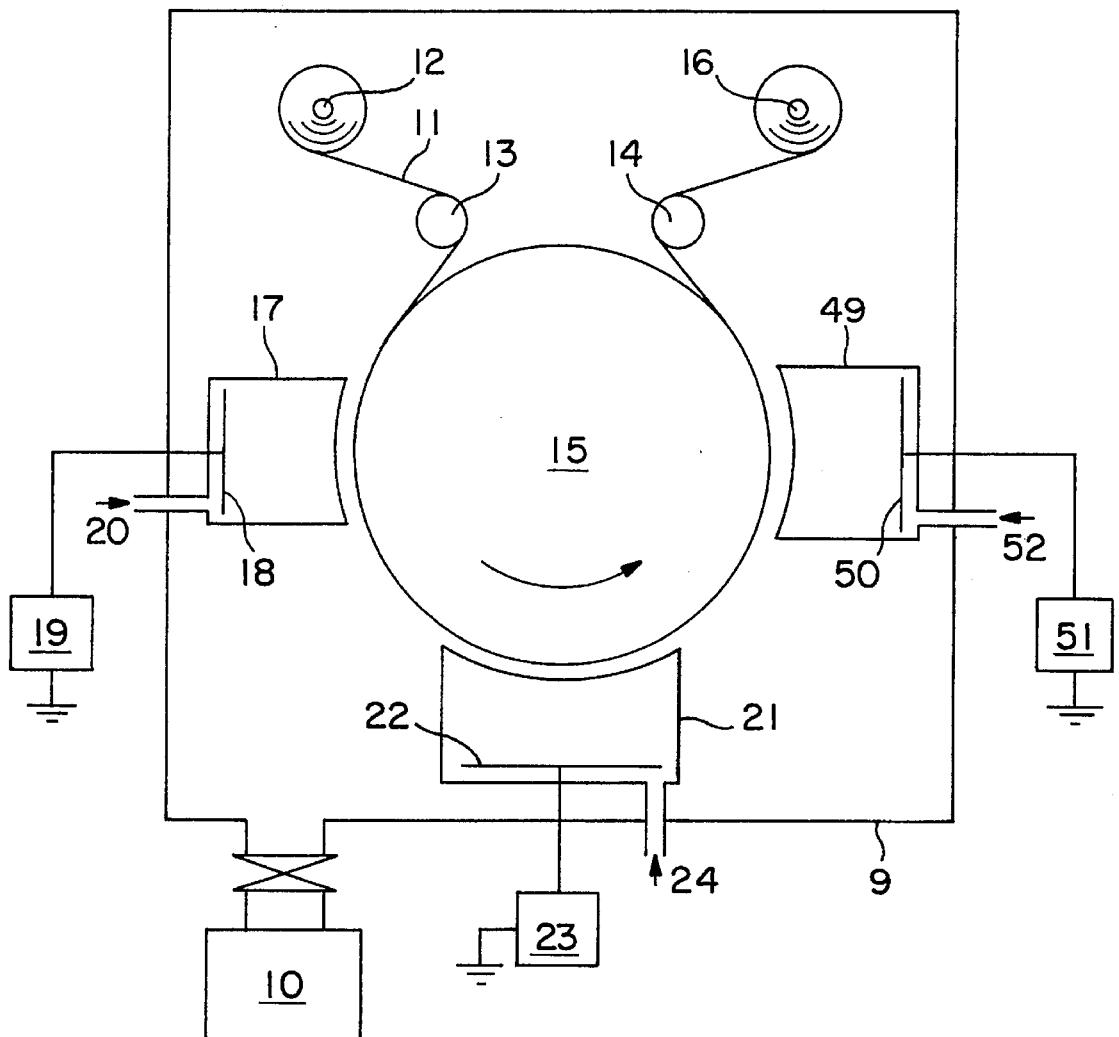

FIG. 5 schematically shows an apparatus used for the production of the magnetic recording medium of the above third embodiment. By this apparatus, the dry etched layer 5, the hard carbonaceous film 6 and the modified layer 7 can be formed in vacuum continuously. That is, the production of the ferromagnetic metal thin film magnetic recording medium corresponds to the production method of the sixth aspect of the present invention.

This apparatus has the same structure as that of FIG. 3 used in the first embodiment except that a discharge tube 49 for modifying the surface of the hard carbonaceous film 6 is provided in the vacuum chamber 9.

The vacuum chamber 9 is evacuated by the vacuum pump 10 to a pressure of $10^{-4}$ torr to $10^{-5}$ torr.

A sheet 11 of the non-magnetic substrate on which the ferromagnetic metal thin film 3 and the back coat layer 4 have been formed is supplied from the unwinder roll 12, passed over the pass roll 13, the cooling drum 14 and the pass roll 14 and then taken up on the winder roll 16. The cooling drum 15 functions to control a conveying rate of the sheet 11 at a constant rate.

The discharge tube 17 comprises a punching metal discharge electrode 18 which is connected to a plasma-generating power source 19. As the power source 19, any of a system for applying a direct current or an alternating current and a system for superposing the direct current and the alternating current can be used. The oxidizing gas is supplied in the discharge tube 17 from a gas inlet 20.

The discharge tube 21 has a pipe-form electrode 22 which is connected to a plasma-generating power source 23. As the power source 23, any of a system for applying a direct current or an alternating current and a system for superposing the direct current and the alternating current can be used. A raw material gas for the plasma which comprises a hydrocarbon gas and an inorganic gas such as argon is supplied from a gas inlet 24 in the discharge tube 21.

The discharge tube 49 comprises a punching metal discharge electrode 50 which is connected to a plasma-generating power source 51. As the power source 51, any of a system for applying a direct current or an alternating current and a system for superposing the direct current and the alternating current can be used. A mixture of the nitrogen-containing gas and the inorganic gas is supplied in the discharge tube 49 from a gas inlet 52.

Examples of the third embodiment will be disclosed.

EXAMPLE 3-1

On one surface of a polyethylene terephthalate film 1 having a thickness of 10 μm which surface had a minute protrusion layer 2 having $10^5$ to $10^9$ minute protrusion per one $mm^2$ with the maximum height roughness $R_{max}$ of 15 nm and a diameter of about 200 nm measured by the surface structure analysis with a scanning tunneling microscope (STM), a ferromagnetic metal thin film 3 of Co—O having a thickness of 180 nm was formed by the continuously incident angle changing vapor deposition method. Further, on the other surface of the polyethylene terephthalate film 1, a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method.

Then, the formed sheet 11 was set on the unwinder roll 12 in the vacuum chamber 9 of the apparatus of FIG. 5.

After evacuating the interior of the vacuum chamber 9, an oxygen gas as an oxidizing gas was introduced in the discharge tube 17 with adjusting the gas flow rate to keep the pressure at 0.05 torr.

In the discharge tube 21, a hexane gas as a hydrocarbon gas and an argon gas as an inorganic gas were introduced at a molar ratio of 4:1 (hexane to argon) with adjusting the flow rates to keep the pressure at 0.3 torr.

In the discharge tube 49, pyridine and a hydrogen gas were introduced at a molar ratio of 3:2 (pyridine to hydrogen) with adjusting the flow rates to keep the pressure at 0.1 torr.

Thereafter, the sheet 11 was conveyed at a rate of 5 m/min. around the drum 15 while a direct current of 800 V was applied to the punching metal discharge electrode 18 to generate nonequilibrium plasma by which the surface of the ferromagnetic metal thin film 3 was dry etched to form the dry etched layer 5 having a thickness of 5 nm.

Further, the direct current of 1300 V was applied to the pipe-form discharge electrode 22 to generate the nonequilibrium plasma to form a hard carbonaceous film 6 having a thickness of 12 nm on the dry etched layer 5.

A direct current of 1500 V was applied to the punching metal discharge electrode 50 to generate nonequilibrium plasma by which the modified layer of 1 nm in thickness was formed on the surface of the hard carbonaceous layer 6.

Then, on the surface of the hard carbonaceous film 6, a solution of $C_5F_{11}(CH_2)_{10}COOH$ in isopropanol at a concentration of 2000 ppm was wet coated and dried to form a lubricant layer 8 having a thickness of 3 nm. Then, the sheet was slit to a width of 8 mm to obtain a 8 mm VCR tape.

The hard carbonaceous film 5 formed in this Example had the Vickers hardness of 2600 $kg/mm^2$.

EXAMPLE 3-2

In the same manner as in Example 3-1 except that the pressure of the oxygen gas for dry etching the ferromagnetic metal thin film 3 was changed to 0.1 torr to form a dry etched layer having a thickness of 8 nm, and allylamine was used in place of pyridine in a molar ratio of allylamine to hydrogen of 1:1, a 8 mm VCR tape was produced.

EXAMPLE 3-3

In the same manner as in Example 3-1 except that the pressure of the oxygen gas for dry etching the ferromagnetic metal thin film 3 was changed to 0.2 torr and a direct current of 1000 V was applied to the discharge electrode 18 to form a dry etched layer having a thickness of 19 nm, a 8 mm VCR tape was produced.

EXAMPLE 3-4

In the same manner as in Example 3-1 except that a direct current of 500 V was applied to the discharge electrode 18 to form a dry etched layer having a thickness of 2 nm, a 8 mm VCR tape was produced.

EXAMPLE 3-5

In the same manner as in Example 3-1 except that allylamine was used in place of pyridine and ammonia gas was used in place of hydrogen in a molar ratio of allylamine to ammonia of 1:3, a 8 mm VCR tape was produced.

EXAMPLE 3-6

In the same manner as in Example 3-1 except that a molar ratio of pyridine to hydrogen was changed to 1:2 and their total pressure was adjusted to 0.3 torr to form a modified layer 7 having a thickness of 2.5 nm, a 8 mm VCR tape was produced.

COMPARATIVE EXAMPLE 3-1

In the same manner as in Example 3-1 except that no dry etched layer was formed so that the hard carbonaceous film 6 was formed directly on the ferromagnetic metal thin film 3 and no modified layer was formed so that the fluorine-containing lubricant layer was formed directly on the hard carbonaceous film 6, a 8 mm VCR tape was produced.

COMPARATIVE EXAMPLE 3-2

In the same manner as in Example 3-1 except that no dry etched layer was formed so that the hard carbonaceous film 6 was formed directly on the ferromagnetic metal thin film 3, a 8 mm VCR tape was produced.

COMPARATIVE EXAMPLE 3-3

In the same manner as in Example 3-1 except that the thickness of the dry etched layer 5 was changed to 24 nm, a 8 mm VCR tape was produced.

COMPARATIVE EXAMPLE 3-4

In the same manner as in Example 1-1 except that the pressure of the oxygen gas for dry etching the ferromagnetic metal thin film 3 was changed to 0.03 torr and a direct current of 300 V was applied to the discharge electrode 18 to form a dry etched layer having a thickness of 1 nm, a 8 mm VCR tape was produced.

COMPARATIVE EXAMPLE 3-5

In the same manner as in Example 3-1 except that benzene was used in place of pyridine to form the modified layer 7, 8 mm VCR tape was produced.

COMPARATIVE EXAMPLE 3-6

In the same manner as in Example 3-1 except that a mixture of pyridine, benzene and hydrogen in a molar ratio of 1:5:1 was used in place of the mixture of pyridine and hydrogen to form the modified layer 7, 8 mm VCR tape was produced.

COMPARATIVE EXAMPLE 3-7

In the same manner as in Example 3-1 except that the thickness of the modified layer 7 was changed to 4 nm, 8 mm VCR tape was produced.

COMPARATIVE EXAMPLE 3-8

In the same manner as in Example 3-1 except that the Vickers hardness of the hard carbonaceous film was changed to 1300 kg/mm$^2$, a 8 mm VCR tape was produced.

Atomic ratios of oxygen to cobalt (O/Co) and oxygen to carbon (O/C), the chemical bonding state of cobalt atoms in the dry etched layer 5, the critical surface tension ($\gamma c$) of the surface of the dry etched layer and the Vickers hardness of the carbonaceous film were measured in the same manners as in Example 1-1.

The chemical composition and chemical bonding state of the modified layer 7 in each of the VCR tapes produced in Examples 3-1 to 3-6 and Comparative Examples 3-1 to 3-8 were analyzed by XPS with the sheet 11 on which the fluorine-containing lubricant layer 8 was not formed.

ture high humidity atmosphere) was measured under the same conditions as in the measurement of the still-frame life in Example 1-1.

A coefficient of friction $\mu_k$ of each VCR tape after the weatherability test was measured as follows:

Around a quarter of a periphery of a stainless steel (SUS 420J2) cylinder having a diameter of 4 mm and a surface roughness of 0.2 S, the tape was wound with contacting the magnetic metal thin film side to the cylinder surface. Then, the tape was slid at a rate of 0.5 mm/sec. under a tension of 30 g at one end, and a tension X g at the other end is measured at a temperature of 25° C. and a humidity of 30% RH. A coefficient of friction was calculated according to the following equation:

$$\mu_k = (2/\pi)\ln(x/30)$$

A coefficient of friction obtained after 30 passes is used. The above results are shown in Table 6.

TABLE 5

| Example No. | Properties of dry etched layer | | | | | Property of hard carbonaceous layer |
|---|---|---|---|---|---|---|
| | O/Co ratio | O/C ratio | Presence of Co$_3$O$_4$ or Co$_2$O$_3$ | $\gamma_c$ [N/cm] | Thickness (nm) | Vickers hardness (kg/mm$^2$) |
| 3-1 | 2.0 | 0.62 | Yes | 46 × 10$^{-5}$ | 5 | 2600 |
| 3-2 | 2.3 | 0.69 | Yes | 48 × 10$^{-5}$ | 8 | 2600 |
| 3-3 | 2.7 | 0.80 | Yes | 53 × 10$^{-5}$ | 19 | 2600 |
| 3-4 | 1.6 | 0.51 | Yes | 41 × 10$^{-5}$ | 2 | 2600 |
| 3-5 | 2.0 | 0.62 | Yes | 46 × 10$^{-5}$ | 5 | 2600 |
| 3.6 | 2.0 | 0.62 | Yes | 46 × 10$^{-5}$ | 5 | 2600 |
| C. 3-1 | — | — | — | — | — | 2600 |
| C. 3-2 | — | — | — | — | — | 2600 |
| C. 3-3 | 3.1 | 0.84 | Yes | 55 × 10$^{-5}$ | 24 | 2600 |
| C. 3-4 | 1.3 | 0.32 | No | 37 × 10$^{-5}$ | 1 | 2600 |
| C. 3-5 | 2.0 | 0.62 | Yes | 46 × 10$^{-5}$ | 1 | 2600 |
| C. 3-6 | 2.0 | 0.62 | Yes | 46 × 10$^{-5}$ | 5 | 2600 |
| C. 3-7 | 2.0 | 0.62 | Yes | 46 × 10$^{-5}$ | 5 | 2600 |
| C. 3-8 | 2.0 | 0.62 | Yes | 46 × 10$^{-5}$ | 5 | 1300 |

| Example No. | Properties of modified layer | | | | |
|---|---|---|---|---|---|
| | N/C ratio (%) | N/O ratio (%) | Total at. % of N, O and C in C—N and C—O bonds | Total at. % of O and N in N—O bonds | Thickness (nm) |
| 3-1 | 3.4 | 33 | 6.2 | ≦1.0 | 1.0 |
| 3-2 | 2.9 | 27 | 4.5 | ≦1.0 | 1.0 |
| 3-3 | 3.4 | 33 | 6.2 | ≦1.0 | 1.0 |
| 3-4 | 3.4 | 33 | 6.2 | ≦1.0 | 1.0 |
| 3-5 | 0.9 | 12 | 3.2 | ≦1.0 | 1.0 |
| 3-6 | 1.7 | 20 | 4.0 | ≦1.0 | 2.5 |
| C. 3-1 | — | — | — | — | — |
| C. 3-2 | 3.4 | 33 | 6.2 | ≦1.0 | 1.0 |
| C. 3-3 | 3.4 | 33 | 6.2 | ≦1.0 | 1.0 |
| C. 3-4 | 3.4 | 33 | 6.2 | ≦1.0 | 1.0 |
| C. 3-5 | — | — | 2.5 | — | 1.0 |
| C. 3-6 | 0.6 | 8.5 | 2.7 | ≦1.0 | 1.0 |
| C. 3-7 | 3.1 | 40 | 6.8 | 1.3 | 4.0 |
| C. 3-8 | 3.4 | 33 | 6.2 | ≦1.0 | 1.0 |

The results are shown in Table 5.

The C/N ratio, still-frame life and weatherability were measured in the same manner as in Example 1-1. The C/N ratios were expressed as relative values to that of Example 3-3 as a standard (0 dB).

Also, a still-frame life of the VCR tape after the weatherability test (still-frame life after storage in high tempera-

TABLE 6

| | Properties of magnetic tape | | | | |
|---|---|---|---|---|---|
| Example No. | C/N (dB) | Still-frame life (min.) | Weather-ability | Still-frame life after weather-ability test (min.) | $\mu_k$ after weather-ability test |
| 3-1 | +0.8 | >60 | 5 | >60 | 0.21 |
| 3-2 | +0.6 | >60 | 5 | >60 | 0.22 |
| 3-3 | 0 | >60 | 5 | >60 | 0.21 |
| 3-4 | +0.9 | >60 | 5 | >60 | 0.22 |
| 3-5 | +0.8 | >60 | 5 | >60 | 0.23 |
| 3-6 | +0.7 | >60 | 5 | >60 | 0.23 |
| C. 3-1 | +0.9 | 30 | 2 | 2 | 0.29 |
| C. 3-2 | +0.9 | >60 | 5 | 40 | 0.24 |
| C. 3-3 | −0.7 | >60 | 5 | >60 | 0.23 |
| C. 3-4 | +0.9 | >60 | 5 | 45 | 0.24 |
| C. 3-5 | +0.8 | 30 | 4 | 5 | 0.27 |
| C. 3-6 | +0.8 | 45 | 5 | 10 | 0.26 |
| C. 3-7 | +0.7 | 40 | 5 | 30 | 0.25 |
| C. 3-8 | +0.8 | 50 | 5 | 30 | 0.25 |

As seen from the results in Tables 5 and 6, the ferromagnetic metal thin film magnetic recording media produced in Examples according to the present invention had the greatly improved adhesion between the ferromagnetic metal thin film and the hard carbonaceous film since the dry etched layer from which the contaminants and the low molecular weight compounds were selectively removed was formed by irradiating the surface of the ferromagnetic metal thin film with the chemically active species containing the atomic oxygen without thermally damaging the metal thin film magnetic media. In addition, since the modified layer having a thickness of less than 3 nm and containing the suitable amount of nitrogen atoms which have high chemical affinity to the polar group (e.g. carboxyl group) of the lubricant molecule was formed on the hard carbonaceous film, the lubricant molecules were strongly adhered to the tape surface without decreasing the hardness of the protective layer consisting of the hard carbonaceous film and the modified layer and without increasing the spacing loss between the ferromagnetic metal thin film and the magnetic head.

Further, good adhesion between the carbonaceous film and the modified layer was achieved, since the chemical species (reactive active species) in the plasma can be deposited with cleaning the surface of the carbonaceous film by exposing the hard carbonaceous film to the glow discharge plasma of the mixture of the nitrogen containing gas and the inorganic gas.

Accordingly, since synergistic effect of the hard carbonaceous film and the lubricant layer can be obtained, the durability, weatherability and running stability of the magnetic tape can be significantly improved.

In Comparative Example 3-1, since neither the dry etched layer nor the modified layer was formed, the adhesion between the ferromagnetic metal thin film and the hard carbonaceous film or between the hard carbonaceous film and the lubricant layer was not improved, so that the still-frame life, weatherability, and the still-frame life and the coefficient of friction $\mu_k$ after storage in the high temperature high humidity atmosphere were greatly deteriorated.

In Comparative Examples 3-2 and 3-4, the adhesion between the ferromagnetic metal thin film and the hard carbonaceous film was not improved and then the still-frame life after storage in the high temperature high humidity atmosphere was decreased, since no dry etched layer was formed on the surface of the ferromagnetic film in Comparative Example 3-2 or since the atomic ratio of oxygen to cobalt and the atomic ratio of oxygen to carbon were outside the suitable ranges of the present invention in Comparative Example 3-4.

In Comparative Example 3-3, since the thickness of the dry etched layer was too large, the magnetic properties of the ferromagnetic metal thin film were worsened and then the C/N ratio was decreased.

In Comparative Examples 3-5 and 3-6, the adhesion between the hard carbonaceous film and the lubricant layer was not improves so that the still-frame life, and the still-frame life and the coefficient of friction $\mu_k$ after storage in the high temperature high humidity atmosphere were greatly deteriorated, since the specific element to be used according to the present invention, namely the nitrogen atom was not contained in the raw material gas for the formation of the modified layer on the hard carbonaceous film in Comparative Example 3-5, or since the atomic ratio of nitrogen to carbon and the atomic ratio of nitrogen to oxygen were outside the suitable ranges of the present invention in Comparative Example 3-6.

In Comparative Example 3-7, the hard carbonaceous film and the lubricant layer was strongly adhered through the modified layer as an intermediate layer because of the chemical affinity between the nitrogen atoms contained in the modified layer and the polar group (e.g. the carboxyl group) of the lubricant molecule. But, since the thickness of the modified layer was too large, the effects of the wear resistance of the hard carbonaceous film and the low shear force of the lubricant layer were not synergistically achieved so that the still-frame life and the still-frame life after the storage in the high temperature high humidity atmosphere were greatly deteriorated.

In Comparative Example 3-8, since the carbonaceous film had the small Vickers hardness, the still-frame life and the still-frame life after storage in the high temperature high humidity atmosphere were deteriorated.

Fourth Embodiment

The third and seventh aspects of the present invention will be explained.

The structure of the magnetic recording medium of this fourth embodiment is substantially the same as that of the third embodiment except that a concentration of the nitrogen atom in the modified layer 7 decreases from its surface in its depth direction (towards the interface with the hard carbonaceous film 6).

Figure 6:
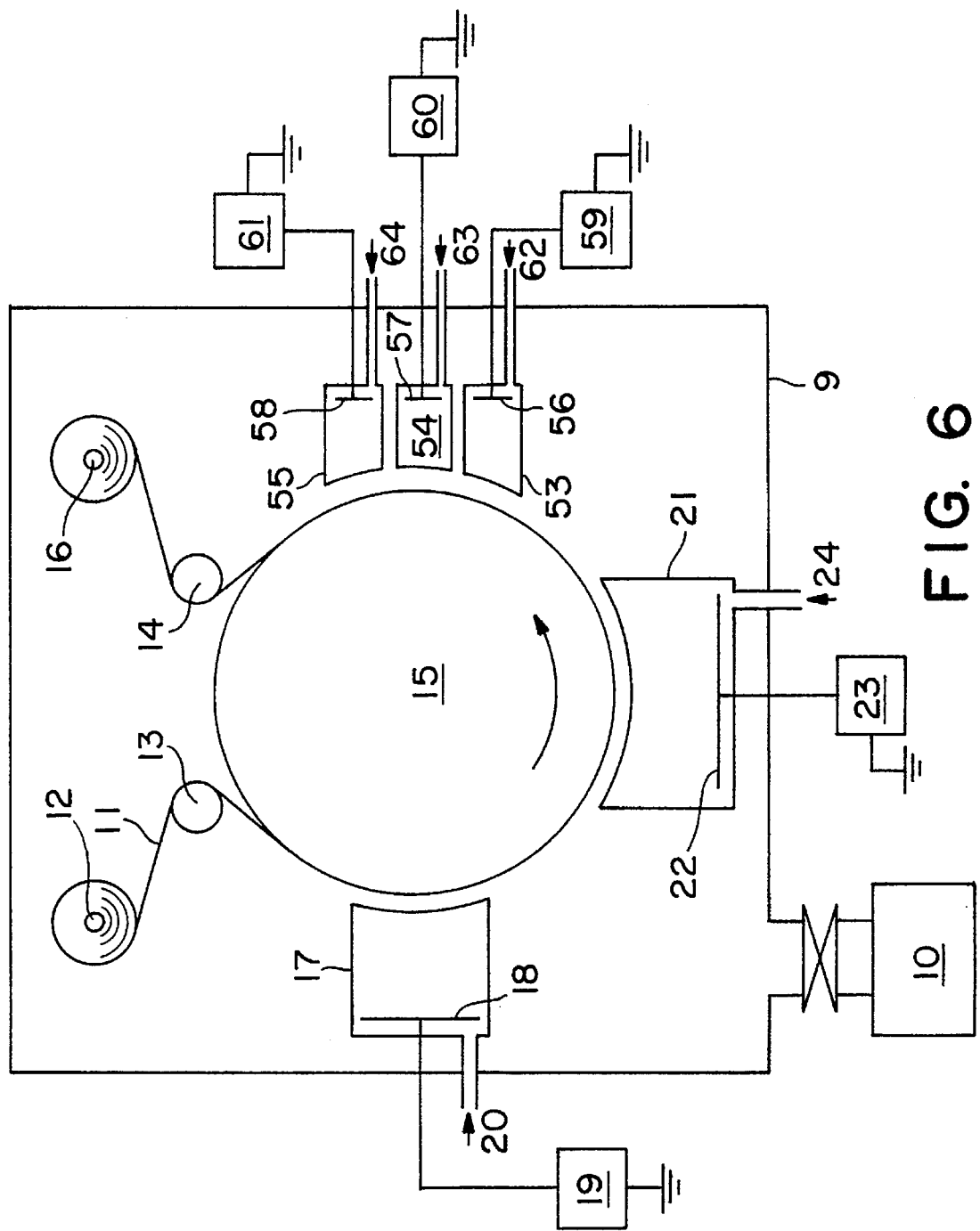

FIG. 6 schematically shows an apparatus used for the production of the magnetic recording medium of the above fourth embodiment. By this apparatus, the dry etched layer 5, the hard carbonaceous film 6 and the modified layer 7 having the concentration gradient of the nitrogen atom can be formed in vacuum continuously. That is, the production of the ferromagnetic metal thin film magnetic recording medium corresponds to the production method of the seventh aspect of the present invention.

This apparatus has the same structure as that of FIG. 3 used in the first embodiment except that discharge tubes 53, 54 and 55 for modifying the surface of the hard carbonaceous film 6 are provided in the vacuum chamber 9.

The vacuum chamber 9 is evacuated by the vacuum pump 10 to a pressure of $10^{-4}$ torr to $10^{-5}$ torr.

A sheet 11 of the non-magnetic substrate on which the ferromagnetic metal thin film 3 and the back coat layer 4 have been formed is supplied from the unwinder roll 12, passed over the pass roll 13, the cooling drum 14 and the pass roll 14 and then taken up on the winder roll 16. The cooling drum 15 functions to control a conveying rate of the sheet 11 at a constant rate.

The discharge tube 17 comprises a punching metal discharge electrode 18 which is connected to a plasma-generating power source 19. As the power source 19, any of a system for applying a direct current or an alternating current and a system for superposing the direct current and the alternating current can be used. The oxidizing gas is supplied in the discharge tube 17 from a gas inlet 20.

The discharge tube 21 has a pipe-form electrode 22 which is connected to a plasma-generating power source 23. As the power source 23, any of a system for applying a direct current or an alternating current and a system for superposing the direct current and the alternating current can be used. A raw material gas for the plasma which comprises a hydrocarbon gas and an inorganic gas such as argon is supplied from a gas inlet 24 in the discharge tube 21.

The discharge tubes 53, 54 and 55 comprise punching metal discharge electrodes 56, 57 and 58, respectively which are connected to respective plasma-generating power sources 59, 60 and 61. As each of the power sources 59, 60 and 61, any of a system for applying a direct current or an alternating current and a system for superposing the direct current and the alternating current can be used. A mixture of the nitrogen-containing gas, the hydrocarbon gas and the inorganic gas having a varying molar ratio is supplied in each of the discharge tubes 53, 54 and 55 from respective gas inlets 62, 63 and 64.

Examples of the fourth embodiment will be disclosed.

EXAMPLE 4-1

On one surface of a polyethylene terephthalate film 1 having a thickness of 10 μm which surface had a minute protrusion layer 2 having $10^5$ to $10^9$ minute protrusion per one mm$^2$ with the maximum height roughness $R_{max}$ of 15 nm and a diameter of about 200 nm measured by the surface structure analysis with a scanning tunneling microscope (STM), a ferromagnetic metal thin film 3 of Co—O having a thickness of 180 nm was formed by the continuously incident angle changing vapor deposition method. Further, on the other surface of the polyethylene terephthalate film 1, a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method.

Then, the formed sheet 11 was set on the unwinder roll 12 in the vacuum chamber 9 of the apparatus of FIG. 6.

After evacuating the interior of the vacuum chamber 9, an oxygen gas as an oxidizing gas was introduced in the discharge tube 17 with adjusting the gas flow rate to keep the pressure at 0.05 torr.

In the discharge tube 21, a hexane gas as a hydrocarbon gas and an argon gas as an inorganic gas were introduced at a molar ratio of 4:1 (hexane to argon) with adjusting the flow rates to keep the pressure at 0.3 torr.

In the discharge tube 53, n-propylamine, methane and a hydrogen gas were introduced at a molar ratio of 2:7:1 (n-propylamine to methane to hydrogen) with adjusting the flow rate to keep the pressure at 0.1 torr. In the discharge tube 54, n-propylamine, methane and a hydrogen gas were introduced at a molar ratio of 4.5:4.5:1 (n-propylamine to methane to hydrogen) with adjusting the flow rates to keep the pressure at 0.1 torr. Further, in the discharge tube 55, n-propylamine, methane and a hydrogen gas were introduced at a molar ratio of 7:2:1 (n-propylamine to methane to hydrogen) with adjusting the flow rates to keep the pressure at 0.1 torr.

Thereafter, the sheet 11 was conveyed at a rate of 5 m/min. around the drum 15 while a direct current of 800 V was applied to the punching metal discharge electrode 18 to generate nonequilibrium plasma by which the surface of the ferromagnetic metal thin film 3 was dry etched to form the dry etched layer 5 having a thickness of 5 nm.

The direct current of 1300 V was applied to the pipe-form discharge electrode 22 to generate the nonequilibrium plasma to form a hard carbonaceous film 6 having a thickness of 12 nm on the dry etched layer 5.

A direct current of 2000 V was applied to each of the punching metal discharge electrodes 56, 57 and 58 to generate nonequilibrium plasma by which the modified layer of 2 nm in thickness in which the concentration of the nitrogen atom decreased from the surface in the depth direction (towards the interface with the hard carbonaceous film) was formed on the surface of the hard carbonaceous layer 6.

Then, on the surface of the hard carbonaceous film 6, a solution of $C_5F_{11}(CH_2)_{10}COOH$ in isopropanol at a concentration of 2000 ppm was wet coated and dried to form a lubricant layer 8 having a thickness of 3 nm. Then, the sheet was slit to a width of 8 mm to obtain a 8 mm VCR tape.

The hard carbonaceous film 5 formed in this Example had the Vickers hardness of 2600 kg/mm$^2$.

EXAMPLE 4-2

In the same manner as in Example 4-1 except that the pressure of the oxygen gas for dry etching the ferromagnetic metal thin film 3 was changed to 0.1 torr to form a dry etched layer having a thickness of 8 nm, and allylamine was used in place of n-propylamine in the formation of the modified layer, a 8 mm VCR tape was produced.

EXAMPLE 4-3

In the same manner as in Example 4-1 except that the pressure of the oxygen gas for dry etching the ferromagnetic metal thin film 3 was changed to 0.2 torr and a direct current of 1000 V was applied to the discharge electrode 18 to form a dry etched layer having a thickness of 19 nm, a 8 mm VCR tape was produced.

EXAMPLE 4-4

In the same manner as in Example 4-1 except that a direct current of 500 V was applied to the discharge electrode 18 to form a dry etched layer having a thickness of 2 nm, a 8 mm VCR tape was produced.

EXAMPLE 4-5

In the same manner as in Example 4-1 except that a thickness of the modified layer in which the concentration of the nitrogen atom decreased from the surface in the depth direction was changed to 2.5 mm, a 8 mm VCR tape was produced.

EXAMPLE 4-6

In the same manner as in Example 4-1 except that the total pressure of the mixture for forming the modified layer 7 was adjusted to 0.05 torr to form a modified layer 7 having a thickness of 1 nm, a 8 mm VCR tape was produced.

EXAMPLE 4-7

In the same manner as in Example 4-1 except that pyridine was used in place of n-propylamine and the total pressure of the mixture for forming the modified layer 7 was adjusted to 0.05 torr to form a modified layer 7 having a thickness of 1 nm, a 8 mm VCR tape was produced.

COMPARATIVE EXAMPLE 4-1

In the same manner as in Example 4-1 except that no dry etched layer was formed so that the hard carbonaceous film 6 was formed directly on the ferromagnetic metal thin film 3, a 8 mm VCR tape was produced.

COMPARATIVE EXAMPLE 4-2

In the same manner as in Example 4-1 except that the thickness of the dry etched layer 5 was changed to 24 nm, a 8 mm VCR tape was produced.

COMPARATIVE EXAMPLE 4-3

In the same manner as in Example 4-1 except that the pressure of the oxygen gas for dry etching the ferromagnetic metal thin film 3 was changed to 0.03 torr and a direct current of 300 V was applied to the discharge electrode 18 to form a dry etched layer having a thickness of 1 nm, a 8 mm VCR tape was produced.

COMPARATIVE EXAMPLE 4-4

In the same manner as in Example 4-1 except that, in place of the mixture of n-propylamine, methane and hydrogen, a mixture of n-propylamine, methane and oxygen each having a molar ratio of 2:7:1, 4.5:4.5:1 and 1:7:2 was used to form the modified layer 7, 8 mm VCR tape was produced.

COMPARATIVE EXAMPLE 4-5

In the same manner as in Example 4-1 except that the modified layer having a thickness of 4 nm in which the concentration of nitrogen atom decreased from the surface in the depth direction was formed, 8 mm VCR tape was produced.

COMPARATIVE EXAMPLE 4-6

In the same manner as in Example 4-1 except that the Vickers hardness of the hard carbonaceous film was changed to 1300 kg/mm$^2$ a 8 mm VCR tape was produced.

In Examples 4-1 to 4-7 and Comparative Examples 4-1, 4-2, 4-3, 4-5 and 4-6, it was confirmed by the angle resolved X-ray photoelectron spectroscopy that the concentration of nitrogen atom decreased from the surface in the depth direction of the modified layer 7.

Atomic ratios of oxygen to cobalt (O/Co) and oxygen to carbon (O/C), the chemical bonding state of cobalt atoms in the dry etched layer 5, the critical surface tension ($\gamma_c$) of the surface of the dry etched layer and the Vickers hardness of the carbonaceous film were measured in the same manners as in Example 1-1.

The chemical composition and chemical bonding state of the modified layer 7 in each of the VCR tapes produced in Examples 4-1 to 4-7 and Comparative Examples 4-1 to 4-6 were analyzed by XPS with the sheet 11 on which the fluorine-containing lubricant layer 8 was not formed.

The results are shown in Table 7.

The same properties of the VCR tapes as those measured in Example 3-1 were measured also. The C/N ratios were expressed as relative values to that of Example 4-3 as a standard (0 dB).

The above results are shown in Table 8.

TABLE 7

| Example No. | Properties of dry etched layer | | | | | Property of hard carbonaceous layer |
|---|---|---|---|---|---|---|
| | O/Co ratio | O/C ratio | Presence of $Co_3O_4$ or $Co_2O_3$ | $\gamma_c$ [N/cm] | Thickness (nm) | Vickers hardness (kg/mm$^2$) |
| 4-1 | 2.0 | 0.62 | Yes | $46 \times 10^{-5}$ | 5 | 2600 |
| 4-2 | 2.3 | 0.69 | Yes | $48 \times 10^{-5}$ | 8 | 2600 |
| 4-3 | 2.7 | 0.79 | Yes | $53 \times 10^{-5}$ | 19 | 2600 |
| 4-4 | 1.6 | 0.51 | Yes | $41 \times 10^{-5}$ | 2 | 2600 |
| 4-5 | 2.0 | 0.62 | Yes | $46 \times 10^{-5}$ | 5 | 2600 |
| 4-6 | 2.0 | 0.62 | Yes | $46 \times 10^{-5}$ | 5 | 2600 |
| 4-7 | 2.0 | 0.62 | Yes | $46 \times 10^{-5}$ | 5 | 2600 |
| C. 4-1 | — | — | — | — | — | 2600 |
| C. 4-2 | 3.1 | 0.84 | Yes | $55 \times 10^{-5}$ | 24 | 2600 |
| C. 4-3 | 1.3 | 0.32 | No | $37 \times 10^{-5}$ | 1 | 2600 |
| C. 4-4 | 2.0 | 0.62 | Yes | $46 \times 10^{-5}$ | 5 | 2600 |
| C. 4-5 | 2.0 | 0.62 | Yes | $46 \times 10^{-5}$ | 5 | 2600 |
| C. 4-6 | 2.0 | 0.62 | Yes | $46 \times 10^{-5}$ | 5 | 1300 |

| Example No. | Properties of modified layer | | | | |
|---|---|---|---|---|---|
| | N/C ratio (%) | N/O ratio (%) | Total at. % of N, O and C in C—N and C—O bonds | Total at. % of O and N in N—O bonds | Thickness (nm) |
| 4-1 | 2.3 | 31 | 5.0 | $\leq 1.0$ | 2.0 |
| 4-2 | 2.5 | 35 | 5.4 | $\leq 1.0$ | 2.0 |
| 4-3 | 2.3 | 31 | 5.0 | $\leq 1.0$ | 2.0 |
| 4-4 | 2.3 | 31 | 5.0 | $\leq 1.0$ | 2.0 |
| 4-5 | 3.0 | 40 | 6.0 | $\leq 1.0$ | 2.5 |
| 4-6 | 1.5 | 10 | 3.5 | $\leq 1.0$ | 1.0 |
| 4-7 | 0.8 | 13 | 3.5 | $\leq 1.0$ | 1.0 |

TABLE 7-continued

| | | | | | |
|---|---|---|---|---|---|
| C. 4-1 | 2.3 | 31 | 5.0 | ≦1.0 | 2.0 |
| C. 4-2 | 2.3 | 31 | 5.0 | ≦1.0 | 2.0 |
| C. 4-3 | 2.3 | 31 | 5.0 | ≦1.0 | 2.0 |
| C. 4-4 | 0.5 | 7.5 | 2.4 | ≦1.0 | 2.0 |
| C. 4-5 | 2.2 | 40 | 7.5 | 1.2 | 4.0 |
| C. 4-6 | 2.3 | 31 | 5.0 | ≦1.0 | 2.0 |

TABLE 8

Properties of magnetic tape

| Example No. | C/N (dB) | Still-frame life (min.) | Weather-ability | Still-frame life after weather-ability test (min.) | $\mu_k$ after weather-ability test |
|---|---|---|---|---|---|
| 4-1 | +0.8 | >60 | 5 | >60 | 0.21 |
| 4-2 | +0.6 | >60 | 5 | >60 | 0.20 |
| 4-3 | 0 | >60 | 5 | >60 | 0.21 |
| 4-4 | +0.9 | >60 | 5 | >60 | 0.22 |
| 4-5 | +0.7 | >60 | 5 | >60 | 0.23 |
| 4-6 | +0.8 | >60 | 5 | >60 | 0.23 |
| 4-7 | +0.8 | >60 | 5 | >60 | 0.23 |
| C. 4-1 | +0.9 | >60 | 5 | 40 | 0.24 |
| C. 4-2 | −0.7 | >60 | 5 | >60 | 0.23 |
| C. 4-3 | +0.9 | >60 | 5 | 45 | 0.24 |
| C. 4-4 | +0.8 | 45 | 5 | 10 | 0.26 |
| C. 4-5 | +0.7 | 40 | 5 | 30 | 0.25 |
| C. 4-6 | +0.8 | 50 | 5 | 30 | 0.25 |

As seen from the results in Tables 7 and 8, the ferromagnetic metal thin film magnetic recording media produced in Examples according to the present invention had the greatly improved adhesion between the ferromagnetic metal thin film and the hard carbonaceous film since the dry etched layer from which the contaminants and the low molecular weight compounds were selectively removed was formed by irradiating the surface of the ferromagnetic metal thin film with the chemically active species containing the atomic oxygen without thermally damaging the metal thin film magnetic media. In addition, since the modified layer having a thickness of less than 3 nm and containing the suitable amount of nitrogen atoms which have high chemical affinity to the polar group (e.g. carboxyl group) of the lubricant molecule was formed on the hard carbonaceous film, the lubricant molecules were strongly adhered to the tape surface without decreasing the hardness of the protective layer consisting of the hard carbonaceous film and the modified layer and without increasing the spacing loss between the ferromagnetic metal thin film and the magnetic head. Since the concentration of nitrogen atom decreased from the surface of the modified layer in its depth direction (towards the interface with the hard carbonaceous film), the internal stress in the modified layer was relaxed moderately.

Further, good adhesion between the carbonaceous film and the modified layer was achieved, since the chemical species (reactive active species) in the plasma can be deposited with cleaning the surface of the carbonaceous film by exposing the hard carbonaceous film to the glow discharge plasma of the mixture of the nitrogen containing gas and the inorganic gas.

Accordingly, since synergistic effect of the hard carbonaceous film and the lubricant layer can be obtained, the durability, weatherability and running stability of the magnetic tape can be significantly improved.

In Comparative Examples 4-1 and 4-3, the adhesion between the ferromagnetic metal thin film and the hard carbonaceous film was not improved, so that the still-frame life after storage in the high temperature high humidity atmosphere was deteriorated, since no dry etched layer was formed in Comparative Example 4-1, or since the atomic ratio of oxygen to cobalt and that of oxygen to carbon were outside the suitable ranges according to the present invention.

In Comparative Example 4-2, since the thickness of the dry etched layer was too large, the magnetic properties of the ferromagnetic metal thin film were worsened and then the C/N ratio was decreased.

In Comparative Example 4-4, since the atomic ratio of nitrogen to carbon and that of nitrogen to oxygen were outside the suitable ranges of the present invention, the adhesion between the hard carbonaceous film and the lubricant layer was not improved so that the still-frame life, and the still-frame life and the coefficient of friction $\mu_k$ after storage in the high temperature high humidity atmosphere were greatly deteriorated.

In Comparative Example 4-5, the hard carbonaceous film and the lubricant layer were strongly adhered through the modified layer as an intermediate layer because of the chemical affinity between the nitrogen atoms contained in the modified layer and the polar group (e.g. the carboxyl group) of the lubricant molecule. But, since the thickness of the modified layer was too large, the effects of the wear resistance of the hard carbonaceous film and the low shear force of the lubricant layer were not synergistically achieved so that the still-frame life and the still-frame life after the storage in the high temperature high humidity atmosphere were greatly deteriorated.

In Comparative Example 4-6, since the Vickers hardness of the carbonaceous film was small, the still-frame life and the still-frame life after the storage in the high temperature high humidity atmosphere were greatly deteriorated.

In the above Examples, the concentration of nitrogen atom in the modified layer changed stepwise, while the same effects can be achieved when the concentration of nitrogen atom in the modified layer changes continuously.

Fifth Embodiment

The second and eighth aspects of the present invention will be explained.

Figure 7:
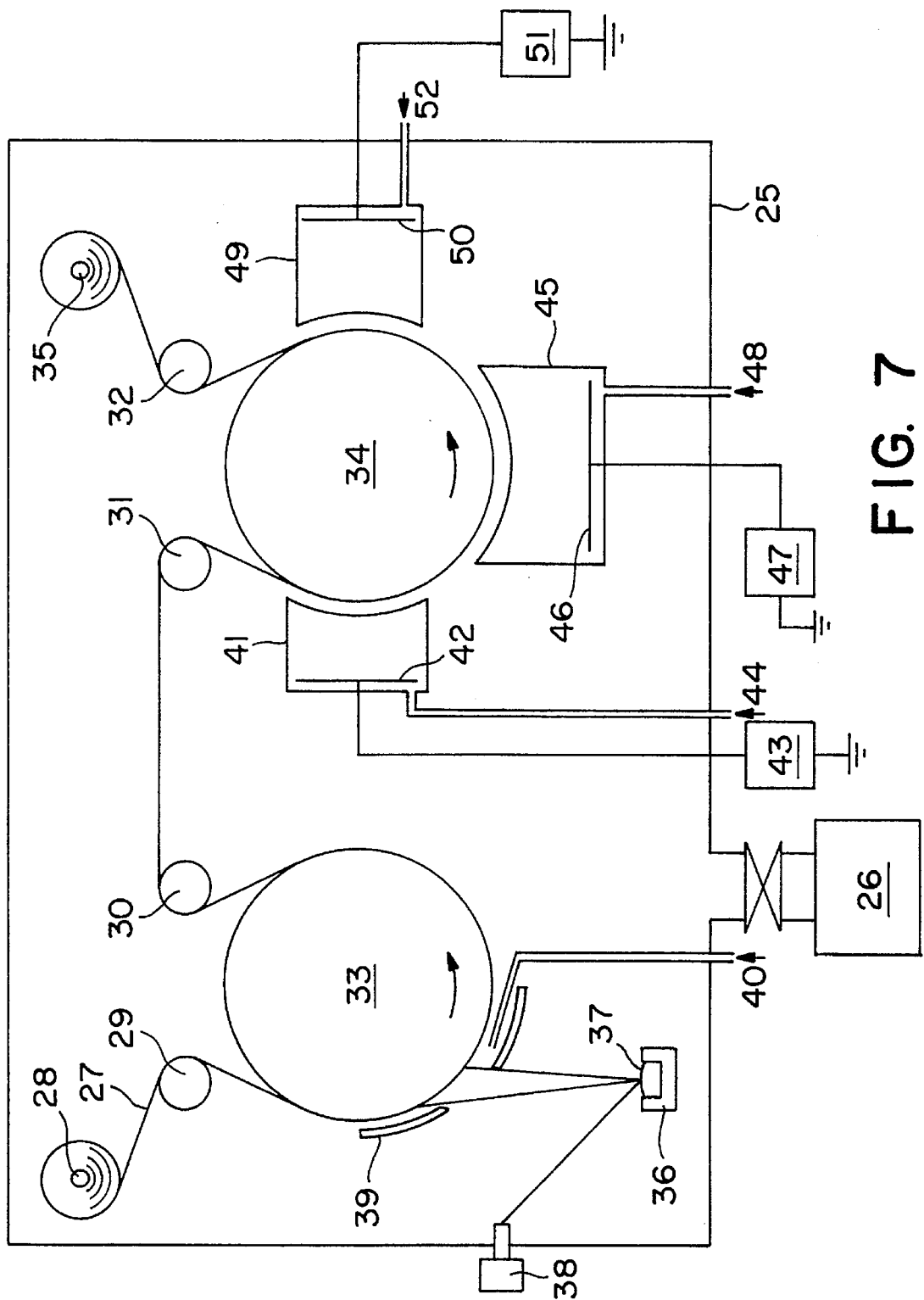

FIG. 7 schematically shows an apparatus used for the production of the magnetic recording medium of the fifth embodiment. By this apparatus, the ferromagnetic metal thin film 3, the dry etched layer 5, the hard carbonaceous film 6 and the modified layer 7 can be formed in vacuum continuously. That is, the production of the ferromagnetic metal thin film magnetic recording medium corresponds to the production method of the eighth aspect of the present invention.

This apparatus has the same structure as that of FIG. 4 used in the second embodiment except that a discharge tube 49 for modifying the surface of the hard carbonaceous film 6 is provided in the vacuum chamber 25.

The vacuum chamber 25 is evacuated by the vacuum pump 26 to a pressure of $1 \times 10^{-5}$ or lower.

A sheet 27 of the non-magnetic substrate on which the back coat layer 4 has been formed is supplied from the unwinder roll 28, passed over the pass roll 29, the cooling drum 33, the pass rolls 30 and 31, the cooling drum 34, the pass roll 32 and then taken up on the winder roll 35. The cooling drums 33 and 34 function to control a conveying rate of the sheet 27 at a constant rate.

The source of the ferromagnetic metal 37 such as cobalt contained in the crucible 36 is heated by the irradiation of electron beam from the gun 38 to generate a stream of vaporized metal. An incident angle of the ferromagnetic metal vapor onto the sheet 27 is adjusted to an angle from 70° to 40° by the shielding mask 39. From a nozzle 40, an oxygen gas is supplied to a portion near the ferromagnetic metal deposition area.

The discharge tube 41 has the same structure as the discharge tube 17 of FIG. 3 and comprises a punching metal discharge electrode 42 which is connected to a plasma-generating power source 43. As the power source 43, any of a system for applying a direct current or an alternating current and a system for superposing the direct current and the alternating current can be used. The oxidizing gas is supplied in the discharge tube 41 from a gas inlet 44.

The discharge tube 45 has the same structure as the discharge tube 21 of FIG. 3 and comprises a pipe-form electrode which is connected to a plasma-generating power source 47. As the power source 47, any of a system for applying a direct current or an alternating current and a system for superposing the direct current and the alternating current can be used. A raw material gas for the plasma which comprises a hydrocarbon gas and an inorganic gas such as argon is supplied from a gas inlet 48 in the discharge tube 45.

The discharge tube 49 comprises a punching metal discharge electrode 50 which is connected to a plasma-generating power source 51. As the power source 51, any of a system for applying a direct current or an alternating current and a system for superposing the direct current and the alternating current can be used. A mixture of the nitrogen-containing gas and the inorganic gas is supplied in the discharge tube 49 from a gas inlet 52.

Examples of the fifth embodiment will be described.

EXAMPLE 5-1

On one surface of a polyethylene terephthalate film 1 having a thickness of 10 μm which surface had a minute protrusion layer 2 having $10^5$ to $10^9$ minute protrusion per one mm$^2$ with the maximum height roughness $R_{max}$ of 15 nm and a diameter of about 200 nm measured by the surface structure analysis with a scanning tunneling microscope (STM), a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method. The back coat layer was formed on the surface having no minute protrusion.

Then, the formed sheet 27 was set on the unwinder roll 28 in the vacuum chamber 25 of the apparatus of FIG. 7.

After evacuating the interior of the vacuum chamber 25, while the sheet was conveyed at a rate of 20 m/min. and a slight amount of oxygen gas was supplied from the nozzle 40, the cobalt metal source 37 in the crucible 36 was irradiated and heated by the electron beam gun 38 to evaporate the cobalt metal. The cobalt metal was then deposited on the other surface of the polyethylene terephthalate film 1 opposite to the back coat layer 4 at an incident angle from 70° to 40° to form a ferromagnetic metal (Co—O) film 3 having a thickness of 180 nm.

Further, an oxygen gas as an oxidizing gas was introduced in the discharge tube 41 with adjusting the gas flow rate to keep the pressure at 0.2 torr and a direct current of 1200 V was applied to the punching metal discharge electrode 42 to generate nonequilibrium plasma by which the surface of the ferromagnetic metal thin film 3 was dry etched to form the dry etched layer 5 having a thickness of 5 nm.

In the discharge tube 45, a toluene gas as a hydrocarbon gas and an argon gas as an inorganic gas were introduced at a molar ratio of 4:1 (toluene to argon) with adjusting the flow rates to keep the pressure at 0.3 torr and the direct current of 1500 V was applied to the pipe-form discharge electrode 46 to generate the nonequilibrium plasma to form a hard carbonaceous film 6 having a thickness of 10 nm on the dry etched layer 5.

In the discharge tube 49, pyridine and a hydrogen gas were introduced at a molar ratio of 3:2 (pyridine to hydrogen) with adjusting the flow rates to keep the pressure at 0.3 torr and the direct current of 1500 V was applied to the punching metal discharge electrode 50 to generate the nonequilibrium plasma to form a modified layer 7 having a thickness of 1 nm on the hard carbonaceous film 6.

Then, on the surface of the hard carbonaceous film 6, a solution of $C_5F_{11}(CH_2)_{10}COOH$ in isopropanol at a concentration of 2000 ppm was wet coated and dried to form a lubricant layer 8 having a thickness of 3 nm. Then, the sheet was slit to a width of 8 mm to obtain a 8 mm VCR tape.

The hard carbonaceous film 5 formed in this Example had the Vickers hardness of 2700 kg/mm$^2$.

EXAMPLE 5-2

In the same manner as in Example 5-1 except that the pressure of the oxygen gas for dry etching the ferromagnetic metal thin film 3 was changed to 0.15 torr and a direct current of 900 V was applied to the discharge electrode 42 to form a dry etched layer having a thickness of 3 nm, a 8 mm VCR tape was produced.

COMPARATIVE EXAMPLE 5-1

In the same manner as in Example 5-1 except that, after the formation of the ferromagnetic metal thin film 3, the vacuum was once broken, the sheet having the ferromagnetic metal thin film was kept standing in a atmosphere of 23° C. and 60% RH for 3 days and thereafter the dry etched layer 5, the hard carbonaceous film 6 and the modified layer 7 were formed in vacuum continuously, a 8 mm VCR tape was produced.

COMPARATIVE EXAMPLE 5-2

In the same manner as in Example 5-1 except that no dry etched layer was formed, a 8 mm VCR was produced.

Atomic ratios of oxygen to cobalt (O/Co) and oxygen to carbon (O/C) and the chemical bonding state of cobalt atoms in the dry etched layer 5 in Examples 5-1 and 5-2 and Comparative Examples 5-1 and 5-2 and the Vickers hardness of the carbonaceous film were measured in the same manners as in Example 1-1.

The chemical composition and chemical bonding state of the modified layer 7 in each of the VCR tapes produced in Examples 5-1 and 5-2 and Comparative Examples 5-1 and 5-2 were analyzed by XPS with the sheet 11 on which the fluorine-containing lubricant layer 8 was not formed.

The results are shown in Table 9.

With each of the VCR tapes produced in Examples 5-1 and 5-2 and Comparative Examples 5-1 and 5-2 , the C/N ratio, the still-frame life, the weatherability and the decreasing rate of Bsδ and further the still-frame life and the coefficient of friction μk after storage in the high temperature high humidity atmosphere, namely, after the weatherability test, were measured by the same methods as in the above Examples. The C/N ratios were expressed as the relative values to that of Example 5-1 as the standard (0 dB).

In addition, the running durability was measured as follows:

Using a 8 mm VCR which was modified for the RF output measurement, a video signal was recording on each of the VCR tapes of 60 minutes recording length at 23° C., 10% RH and repeatedly reproduced to evaluate the running durability. The running durability was expressed by the number of passes at which the reproduced output signal decreased by 3 dB from the output signal in the first pass (0 dB).

The results are shown in Table 10.

of the protective layer consisting of the hard carbonaceous film and the modified layer and without increasing the spacing loss between the ferromagnetic metal thin film and the magnetic head.

Further, good adhesion between the carbonaceous film and the modified layer was achieved, since the chemical species (reactive active species) in the plasma can be deposited with cleaning the surface of the carbonaceous film by exposing the hard carbonaceous film to the glow discharge plasma of the mixture of the nitrogen containing gas and the inorganic gas.

TABLE 9

| | Properties of dry etched layer | | | | | Property of hard carbonaceous layer |
|---|---|---|---|---|---|---|
| Example No. | O/Co ratio | O/C ratio | Presence of $Co_3O_4$ or $Co_2O_3$ | $\gamma_c$ [N/cm] | Thickness (nm) | Vickers hardness (kg/mm$^2$) |
| 5-1 | 2.2 | 0.64 | Yes | $47 \times 10^{-5}$ | 5 | 2700 |
| 5-2 | 1.8 | 0.61 | Yes | $42 \times 10^{-5}$ | 3 | 2700 |
| C. 5-1 | 1.9 | 0.56 | Yes | $44 \times 10^{-5}$ | 5 | 2700 |
| C. 5-2 | — | — | — | — | — | 2700 |

| | Properties of modified layer | | | |
|---|---|---|---|---|
| Example No. | N/C ratio (%) | N/O ratio (%) | Total at. % of N, O and C in C—N and C—O bonds | Total at. % of O and N in N—O bonds | Thickness (nm) |
| 5-1 | 3.5 | 37 | 6.4 | ≦1.0 | 1.0 |
| 5-2 | 3.5 | 37 | 6.4 | ≦1.0 | 1.0 |
| C. 5-1 | 3.5 | 37 | 6.4 | ≦1.0 | 1.0 |
| C. 5-2 | 3.5 | 37 | 6.4 | ≦1.0 | 1.0 |

TABLE 10

| | Properties of magnetic tape | | | | | |
|---|---|---|---|---|---|---|
| Example No. | C/N (dB) | Still-frame life (min.) | Weatherability | Decreasing rate of Bs$\delta$ | Still-frame life after weatherability test (min.) | $\mu_k$ after weatherability test | Running durability (passes) |
| 5-1 | 0 | >60 | 5 | 0.9 | >60 | 0.19 | 300 |
| 5-2 | +0.1 | >60 | 5 | 1.1 | >60 | 0.20 | 300 |
| C. 5-1 | 0 | >60 | 5 | 2.7 | >60 | 0.21 | 250 |
| C. 5-2 | +0.1 | >60 | 5 | 5.4 | 45 | 0.23 | 150 |

As seen from the results in Tables 9 and 10, the ferromagnetic metal thin film magnetic recording media produced in Examples according to the present invention had the greatly improved adhesion between the ferromagnetic metal thin film and the hard carbonaceous film since the dry etched layer from which the contaminants and the low molecular weight compounds were selectively removed was formed by irradiating the surface of the ferromagnetic metal thin film with the chemically active species containing the atomic oxygen without thermally damaging the metal thin film magnetic media. In addition, since the modified layer containing the suitable amount of nitrogen atoms having high chemical affinity to the polar group (e.g. carboxyl group) of the lubricant molecule was formed on the hard carbonaceous film, the lubricant molecules were strongly adhered to the tape surface without decreasing the hardness Accordingly, since synergistic effect of the hard carbonaceous film and the lubricant layer can be obtained, the durability, weatherability and running stability of the magnetic tape can be significantly improved.

In addition, since the ferromagnetic metal thin film, the dry etched layer, the hard carbonaceous film and the modified layer were continuously formed in vacuum, the adsorption of moisture and so on in the air onto the surface of the ferromagnetic metal thin film was considerably reduced so that the decreasing rate of Bs$\delta$ was made small and the running durability was significantly improved.

In Comparative Example 5-1, the decreasing rate of Bs$\delta$ was large and the running durability was decreased due the adsorption of the moisture and so on in the air onto the surface of the ferromagnetic metal thin film.

In Comparative Example 5-2, the adhesion between the ferromagnetic metal thin film and the hard carbonaceous film was not improved sufficiently and then the decreasing rate of Bsδ, the still-frame life after storage in the high temperature high humidity atmosphere, and the running durability were deteriorated, since no dry etched layer was formed on the surface of the ferromagnetic metal thin film.

Sixth Embodiment

The third and ninth aspects of the present invention will be explained.

Figure 8:
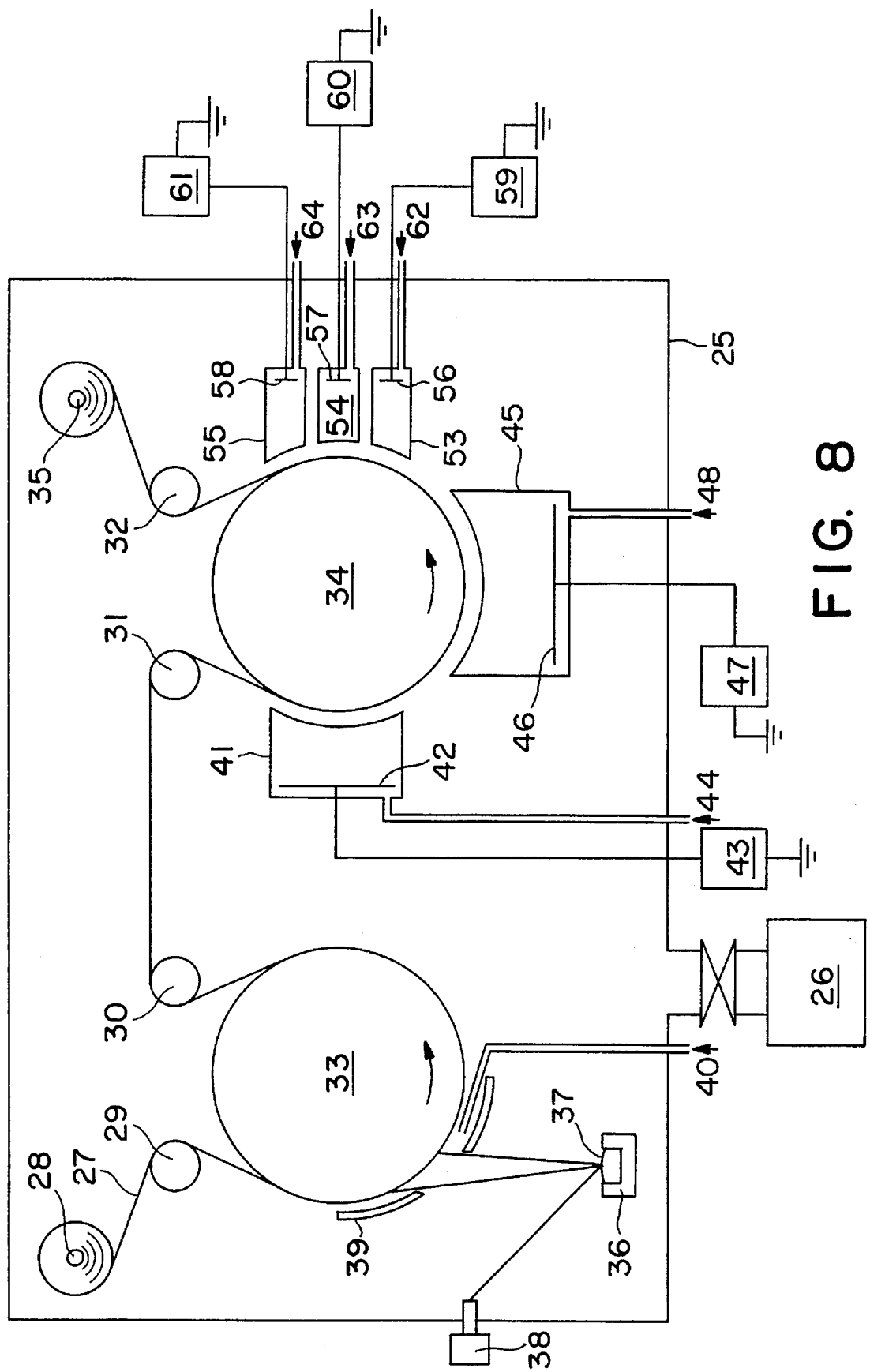

FIG. 8 schematically shows an apparatus used for the production of the magnetic recording medium of the sixth embodiment. By this apparatus, the ferromagnetic metal thin film 3, the dry etched layer 5, the hard carbonaceous film 6 and the modified layer 7 having the concentration gradient of nitrogen atom can be formed in vacuum continuously. That is, the production of the ferromagnetic metal thin film magnetic recording medium corresponds to the production method of the ninth aspect of the present invention.

This apparatus has the same structure as that of FIG. 4 used in the second embodiment except that discharge tubes 53, 54 and 55 for modifying the surface of the hard carbonaceous film 6 are provided in the vacuum chamber 25.

The vacuum chamber 25 is evacuated by the vacuum pump 26 to a pressure of $1 \times 10^{-5}$ or lower.

A sheet 27 of the non-magnetic substrate on which the back coat layer 4 has been formed is supplied from the unwinder roll 28, passed over the pass roll 29, the cooling drum 33, the pass rolls 30 and 31, the cooling drum 34, the pass roll 32 and then taken up on the winder roll 35. The cooling drums 33 and 34 function to control a conveying rate of the sheet 27 at a constant rate.

The source of the ferromagnetic metal 37 such as cobalt contained in the crucible 36 is heated by the irradiation of electron beam from the gun 38 to generate a stream of vaporized metal. An incident angle of the ferromagnetic metal vapor onto the sheet 27 is adjusted to an angle from 70° to 40° by the shielding mask 39. From a nozzle 40, an oxygen gas is supplied to a portion near the ferromagnetic metal deposition area.

The discharge tube 41 has the same structure as the discharge tube 17 of FIG. 3 and comprises a punching metal discharge electrode 42 which is connected to a plasma-generating power source 43. As the power source 43, any of a system for applying a direct current or an alternating current and a system for superposing the direct current and the alternating current can be used. The oxidizing gas is supplied in the discharge tube 41 from a gas inlet 44.

The discharge tube 45 has the same structure as the discharge tube 21 of FIG. 3 and comprises a pipe-form electrode which is connected to a plasma-generating power source 47. As the power source 47, any of a system for applying a direct current or an alternating current and a system for superposing the direct current and the alternating current can be used. A raw material gas for the plasma which comprises a hydrocarbon gas and an inorganic gas such as argon is supplied from a gas inlet 48 in the discharge tube 45.

The discharge tubes 53, 54 and 55 comprise punching metal discharge electrodes 56, 57 and 58, respectively which are connected to respective plasma-generating power sources 59, 60 and 61. As each of the power sources 59, 60 and 61, any of a system for applying a direct current or an alternating current and a system for superposing the direct current and the alternating current can be used. A mixture of the nitrogen-containing gas, the hydrocarbon gas and the inorganic gas is supplied in each of the discharge tubes 53, 54 and 55 from respective gas inlets 62, 63 and 64.

Examples of the sixth embodiment will be described.

EXAMPLE 6-1

On one surface of a polyethylene terephthalate film 1 having a thickness of 10 μm which surface had a minute protrusion layer 2 having $10^5$ to $10^9$ minute protrusion per one $mm^2$ with the maximum height roughness $R_{max}$ of 15 nm and a diameter of about 200 nm measured by the surface structure analysis with a scanning tunneling microscope (STM), a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method. The back coat layer was formed on the surface having no minute protrusion.

Then, the formed sheet 27 was set on the unwinder roll 28 in the vacuum chamber 25 of the apparatus of FIG. 8.

After evacuating the interior of the vacuum chamber 25, while the sheet was conveyed at a rate of 20 m/min. and a slight amount of oxygen gas was supplied from the nozzle 40, the cobalt metal source 37 in the crucible 36 was irradiated and heated by the electron beam gun 38 to evaporate the cobalt metal. The cobalt metal was then deposited on the other surface of the polyethylene terephthalate film 1 opposite to the back coat layer 4 at an incident angle from 70° to 40° to form a ferromagnetic metal (Co—O) film 3 having thickness of 180 nm.

Further, an oxygen gas as an oxidizing gas was introduced in the discharge tube 41 with adjusting the gas flow rate to keep the pressure at 0.2 torr and a direct current of 1200 V was applied to the punching metal discharge electrode 42 to generate nonequilibrium plasma by which the surface of the ferromagnetic metal thin film 3 was dry etched to form the dry etched layer 5 having a thickness of 5 nm.

In the discharge tube 45, a toluene gas as a hydrocarbon gas and an argon gas as an inorganic gas were introduced at a molar ratio of 4:1 (toluene to argon) with adjusting the flow rates to keep the pressure at 0.3 torr and the direct current of 1500 V was applied to the pipe-form discharge electrode 46 to generate the nonequilibrium plasma to form a hard carbonaceous film 6 having a thickness of 10 nm on the dry etched layer 5.

In the discharge tube 53, n-propylamine, methane and a hydrogen gas were introduced at a molar ratio of 2:7:1(n-propylamine to methane to hydrogen) with adjusting the flow rate to keep the pressure at 0.3 torr. In the discharge tube 54, n-propylamine, methane and a hydrogen gas were introduced at a molar ratio of 4.5:4.5:1 (n-propylamine to methane to hydrogen) with adjusting the flow rates to keep the pressure at 0.3 torr. Further, in the discharge tube 55, n-propylamine, methane and a hydrogen gas were introduced at a molar ratio of 7:2:1 (n-propylamine to methane to hydrogen) with adjusting the flow rates to keep the pressure at 0.3 torr. Under such conditions, a direct current of 2000 V was applied to each of the punching metal discharge electrodes 56, 57 and 58 to generate nonequilibrium plasma by which the modified layer of 2 nm in thickness in which the concentration of the nitrogen atom decreased from the surface in the depth direction (towards the interface with the hard carbonaceous film) was formed on the surface of the hard carbonaceous layer 6.

Then, on the surface of the modified layer 7, a solution of $C_5F_{11}(CH_2)_{10}COOH$ in isopropanol at a concentration of 2000 ppm was wet coated and dried to form a lubricant layer 8 having a thickness of 3 nm. Then, the sheet was slit to a width of 8 mm to obtain a 8 mm VCR tape.

The hard carbonaceous film 5 formed in this Example had the Vickers hardness of 2700 $kg/mm^2$.

EXAMPLE 6-2

In the same manner as in Example 6-1 except that the pressure of the oxygen gas for dry etching the ferromagnetic metal thin film 3 was changed to 0.15 torr and a direct current of 900 V was applied to the discharge electrode 42 to form a dry etched layer having a thickness of 3 nm, a 8 mm VCR tape was produced.

COMPARATIVE EXAMPLE 6-1

In the same manner as in Example 6-1 except that, after the formation of the ferromagnetic metal thin film 3, the vacuum was once broken, the sheet having the ferromagnetic metal thin film was kept standing in a atmosphere of 23° C. and 60% RH for 3 days and thereafter the dry etched layer 5, the hard carbonaceous film 6 and the modified layer 7 were formed in vacuum continuously, a 8 mm VCR tape was produced.

COMPARATIVE EXAMPLE 6-2

In the same manner as in Example 6-1 except that no dry etched layer was formed, a 8 mm VCR was produced.

hardness of the carbonaceous film were measured in the same manners as in Example 1-1.

The chemical composition and chemical bonding state of the modified layer 7 in each of the VCR tapes produced in Examples 6-1 and 6-2 and Comparative Examples 6-1 and 6-2 were analyzed by XPS with the sheet 11 on which the fluorine-containing lubricant layer 8 was not formed.

The results are shown in Table 11.

With each of the VCR tapes produced in Examples 6-1 and 6-2 and Comparative Examples 6-1 and 6-2, the same properties as those measured in Example 5-1 were measured by the same methods as in the above Examples. The C/N ratios were expressed as the relative values to that of Example 6-1 as the standard (0 dB).

The results are shown in Table 12.

TABLE 11

| | Properties of dry etched layer | | | | | Property of hard carbonaceous layer |
|---|---|---|---|---|---|---|
| Example No. | O/Co ratio | O/C ratio | Presence of $Co_3O_4$ or $Co_2O_3$ | $\gamma_c$ [N/cm] | Thickness (nm) | Vickers hardness (kg/mm$^2$) |
| 6-1 | 2.2 | 0.64 | Yes | $47 \times 10^{-5}$ | 5 | 2700 |
| 6-2 | 1.8 | 0.61 | Yes | $42 \times 10^{-5}$ | 3 | 2700 |
| C. 6-1 | 1.9 | 0.56 | Yes | $44 \times 10^{-5}$ | 5 | 2700 |
| C. 6-2 | — | — | — | — | | 2700 |

| | Properties of modified layer | | | | |
|---|---|---|---|---|---|
| Example No. | N/C ratio (%) | N/O ratio (%) | Total at. % of N, O and C in C—N and C—O bonds | Total at. % of O and N in N—O bonds | Thickness (nm) |
| 6-1 | 2.4 | 33 | 5.2 | ≦1.0 | 2.0 |
| 6-2 | 2.4 | 33 | 5.2 | ≦1.0 | 2.0 |
| C. 6-1 | 2.4 | 33 | 5.2 | ≦1.0 | 2.0 |
| C. 6-2 | 2.4 | 33 | 5.2 | ≦1.0 | 2.0 |

TABLE 12

| | Properties of magnetic tape | | | | | | |
|---|---|---|---|---|---|---|---|
| Example No. | C/N (dB) | Still-frame life (min.) | Weatherability | Decreasing rate of $Bs\delta$ | Still-frame life after weatherability test (min.) | $\mu_k$ after weatherability test | Running durability (passes) |
| 6-1 | 0 | >60 | 5 | 0.8 | >60 | 0.19 | 300 |
| 6-2 | +0.1 | >60 | 5 | 1.1 | >60 | 0.20 | 300 |
| C. 6-1 | 0 | >60 | 5 | 2.6 | >60 | 0.21 | 255 |
| C. 6-2 | +0.1 | >60 | 5 | 5.1 | 45 | 0.23 | 160 |

In Examples 6-1 and 6-2 and Comparative Examples 6-1 and 6-2, it was confirmed by the angle resolved X-ray photoelectron spectroscopy that the concentration of nitrogen atom decreased from the surface in the modified direction of the modified layer 7.

Atomic ratios of oxygen to cobalt (O/Co) and oxygen to carbon (O/C) and the chemical bonding state of cobalt atoms in the dry etched layer 5 and the critical surface tension ($\gamma_c$) of the surface of the dry etched layer 6 in Examples 6-1 and 6-2 and Comparative Examples 6-1 and 6-2 and the Vickers As seen from the results in Tables 11 and 12, the ferromagnetic metal thin film magnetic recording media produced in Examples according to the present invention had the greatly improved adhesion between the ferromagnetic metal thin film and the hard carbonaceous film since the dry etched layer from which the contaminants and the low molecular weight compounds were selectively removed was formed by irradiating the surface of the ferromagnetic metal thin film with the chemically active species containing the atomic oxygen without thermally damaging the metal thin film magnetic media. In addition, since the modified layer containing the suitable amount of nitrogen atoms having high chemical affinity to the polar group (e.g. carboxyl group) of the lubricant molecule was formed on the hard carbonaceous film, the lubricant molecules were strongly adhered to the tape surface without decreasing the hardness of the protective layer consisting of the hard carbonaceous film and the modified layer and without increasing the spacing loss between the ferromagnetic metal thin film and the magnetic head.

Further, good adhesion between the carbonaceous film and the modified layer was achieved, since the concentration of nitrogen atom in the modified layer decreased from its surface in the depth direction (towards the interface with the hard carbonaceous film), the internal stress in the modified layer can be relaxed moderately, and the chemical species (reactive active species) in the plasma can be deposited with cleaning the surface of the carbonaceous film by exposing the hard carbonaceous film to the glow discharge plasma of the mixture of the nitrogen containing gas and the inorganic gas.

Accordingly, since synergistic effect of the hard carbonaceous film and the lubricant layer can be obtained, the durability, weatherability and running stability of the magnetic tape can be significantly improved.

In addition, since the ferromagnetic metal thin film, the dry etched layer, the hard carbonaceous film and the modified layer were continuously formed in vacuum, the adsorption of moisture and so on in the air onto the surface of the ferromagnetic metal thin film was considerably reduced so that the decreasing rate of $Bs\delta$ was made small and the running durability was significantly improved.

In Comparative Example 6-1, the decreasing rate of $Bs\delta$ was large and the running durability was decreased due the adsorption of the moisture and so on in the air onto the surface of the ferromagnetic metal thin film.

In Comparative Example 6-2, the adhesion between the ferromagnetic metal thin film and the hard carbonaceous film was not improved sufficiently and then the decreasing rate of $Bs\delta$, the still-frame life after storage in the high temperature high humidity atmosphere, and the running durability were deteriorated, since no dry etched layer was formed on the surface of the ferromagnetic metal thin film.

What is claimed is:

1. A ferromagnetic metal thin film recording medium comprising a non-magnetic substrate, a ferromagnetic metal thin film comprising aggregates of columnar crystal particles of cobalt formed on said non-magnetic substrate, a dry etched layer which is formed in a surface layer of said ferromagnetic metal thin film and contains oxygen atoms in a higher concentration than the remaining part of said ferromagnetic metal thin film, a carbonaceous film formed on said dry etched layer of said ferromagnetic metal thin film, and in which an atomic ratio of oxygen to carbon measured at an interface between said carbonaceous film and said dry etched layer is at least 0.50:1, and a lubricant layer formed on said carbonaceous film.

2. The ferromagnetic metal thin film recording medium according to claim 1, wherein an atomic ratio of oxygen to cobalt in said dry etched layer is at least 1.5;1.

3. The ferromagnetic metal thin film recording medium according to claim 1, wherein said dry etched layer contains at least one cobalt oxide selected from the group consisting of $Co_3O_4$ and $Co_2O_3$.

4. The ferromagnetic metal thin film recording medium according to claim 1, wherein said dry etched layer has a thickness of 1 nm to 20 nm.

5. The ferromagnetic metal thin film recording medium according to claim 1, wherein a surface of said dry etched layer has a critical surface tension ($\gamma c$) of at least $40 \times 10^{-5}$ N/cm.

6. The ferromagnetic metal thin film recording medium according to claim 1, wherein said carbonaceous film has a Vickers hardness of at least 2000 kg/mm$^2$.

7. The ferromagnetic metal thin film recording medium according to claim 1, wherein said lubricant layer comprises a fluorine-containing compound having at least one polar functional group selected from the group consisting of —COOH, —OH, —SH, —NH$_2$, =NH, —NCO, —CONH$_2$, —CONHR, —CONR$_2$, —COOR, =PR, =PRO, =PRS, —OPO(OH)$_2$, —OPO(OR)$_2$, and —SO$_3$M wherein R is a hydrocarbon group having 1 to 22 carbon atoms, and M is a hydrogen atom, an alkali metal atom or an alkaline earth metal atom.

8. A ferromagnetic metal thin film recording medium comprising a non-magnetic substrate, a ferromagnetic metal thin film comprising aggregates of columnar crystal particles of cobalt formed on said non-magnetic substrate, a dry etched layer which is formed in a surface layer of said ferromagnetic metal thin film and contains oxygen atoms in a higher concentration than the remaining part of said ferromagnetic metal thin film, a carbonaceous film formed on said dry etched layer of said ferromagnetic metal thin film, and in which an atomic ratio of oxygen to carbon measured at an interface between said carbonaceous film and said dry etched layer is at least 0.50:1, a modified layer formed on said carbonaceous film, which modified layer modifies a surface of said carbonaceous film and has a thickness of less than 3 nm and comprises carbon atoms, nitrogen atoms and oxygen atoms with an atomic ratio of nitrogen to carbon being at least 0.8:100, and a lubricant layer formed on said modified layer.

9. The ferromagnetic metal thin film recording medium according to claim 8, wherein an atomic ratio of oxygen to cobalt in said dry etched layer is at least 1.5:1.

10. The ferromagnetic metal thin film recording medium according to claim 8, wherein said dry etched layer contains at least one cobalt oxide selected from the group consisting of $Co_3O_4$ and $Co_2O_3$.

11. The ferromagnetic metal thin film recording medium according to claim 8, wherein said dry etched layer has a thickness of 1 nm to 20 nm.

12. The ferromagnetic metal thin film recording medium according to claim 8, wherein a surface of said dry etched layer has a critical surface tension ($\gamma c$) of at least $40 \times 10^{-5}$ N/cm.

13. The ferromagnetic metal thin film recording medium according to claim 8, wherein an atomic ratio of nitrogen to oxygen in said modified layer is at least 10:100.

14. The ferromagnetic metal thin film recording medium according to claim 8, wherein a total amount of nitrogen, oxygen and carbon atoms which contribute to the C—N and C—O bonds in said modified layer is at least 3.0 atomic % based on all the carbon atoms in said modified layer, and a total amount of the nitrogen and oxygen atoms which contribute to the N—O bonds in said modified layer is more than zero and not more than 1.0 atomic % based on all the carbon atoms in said modified layer.

15. The ferromagnetic metal thin film recording medium according to claim 8, wherein said carbonaceous film has a Vickers hardness of at least 2000 kg/mm$^2$.

16. The ferromagnetic metal thin film recording medium according to claim 8, wherein said lubricant layer comprises a fluorine-containing compound having at least one polar functional group selected from the group consisting of —COOH, —OH, —SH, —NH$_2$, =NH, —NCO, —CONH$_2$, —CONHR, —CONR$_2$, —COOR, =PR, =PRO, =PRS, —OPO(OH)$_2$, —OPO(OR)$_2$, and —SO$_3$M wherein R is a hydrocarbon group having 1 to 22 carbon atoms, and M is a hydrogen atom, an alkali metal atom or an alkaline earth metal atom.

17. A ferromagnetic metal thin film recording medium comprising a non-magnetic substrate, a ferromagnetic metal thin film comprising aggregates of columnar crystal particles of cobalt formed on said non-magnetic substrate, a dry etched layer which is formed in a surface layer of said ferromagnetic metal thin film and contains oxygen atoms in a higher concentration than the remaining part of said ferromagnetic metal thin film, a carbonaceous film formed on said dry etched layer of said ferromagnetic metal thin film, and in which an atomic ratio of oxygen to carbon measured at an interface between said carbonaceous film and said dry etched layer is at least 0.50:1, a modified layer formed on said carbonaceous film, which modified layer modifies a surface of said carbonaceous film and has a thickness of less than 3 nm and comprises carbon atoms, nitrogen atoms and oxygen atoms with an atomic ratio of nitrogen to carbon being at least 0.8:100 and in which a concentration of nitrogen atoms decreases in a depth direction from its surface, and a lubricant layer formed on said modified layer.

18. The ferromagnetic metal thin film recording medium according to claim 17, wherein an atomic ratio of oxygen to cobalt in said dry etched layer is at least 1.5:1.

19. The ferromagnetic metal thin film recording medium according to claim 17, wherein said dry etched layer contains at least one cobalt oxide selected from the group consisting of Co$_3$O$_4$ and Co$_2$O$_3$.

20. The ferromagnetic metal thin film recording medium according to claim 17, wherein said dry etched layer has a thickness of 1 nm to 20 nm.

21. The ferromagnetic metal thin film recording medium according to claim 17, wherein a surface of said dry etched layer has a critical surface tension (γc) of at least $40 \times 10^{-5}$ N/cm.

22. The ferromagnetic metal thin film recording medium according to claim 17, wherein an atomic ratio of nitrogen to oxygen in said modified layer is at least 10:100.

23. The ferromagnetic metal thin film recording medium according to claim 17, wherein a total amount of nitrogen, oxygen and carbon atoms which contribute to the C—N and C—O bonds in said modified layer is at least 3.0 atomic % based on all the carbon atoms in said modified layer, and a total amount of the nitrogen and oxygen atoms which contribute to the N—O bonds in said modified layer is more than zero and not more than 1.0 atomic % based on all the carbon atoms in said modified layer.

24. The ferromagnetic metal thin film recording medium according to claim 17, wherein said carbonaceous film has a Vickers hardness of at least 2000 kg/mm$^2$.

25. The ferromagnetic metal thin film recording medium according to claim 17, wherein said lubricant layer comprises a fluorine-containing compound having at least one polar functional group selected from the group consisting of —COOH, —OH, —SH, —NH$_2$, =NH, —NCO, —CONH$_2$, —CONHR, —CONR$_2$, —COOR, =PR, =PRO, =PRS, —OPO(OH)$_2$, —OPO(OR)$_2$, and —SO$_3$M wherein R is a hydrocarbon group having 1 to 22 carbon atoms, and M is a hydrogen atom, an alkali metal atom or an alkaline earth metal atom.

\* \* \* \* \*